US008874525B2

(12) United States Patent
Grossman et al.

(10) Patent No.: US 8,874,525 B2
(45) Date of Patent: Oct. 28, 2014

(54) HIERARCHICAL DISPLAY AND NAVIGATION OF DOCUMENT REVISION HISTORIES

(75) Inventors: Tovi Grossman, Toronto (CA); Justin Frank Matejka, Etobicoke (CA); George Fitzmaurice, Toronto (CA)

(73) Assignee: AUTODESK, Inc., San Rafael, CA (US)

( * ) Notice: Subject to any disclaimer, the term of this patent is extended or adjusted under 35 U.S.C. 154(b) by 298 days.

(21) Appl. No.: 13/090,141

(22) Filed: Apr. 19, 2011

(65) Prior Publication Data

US 2012/0271867 A1    Oct. 25, 2012

(51) Int. Cl.
G06F 17/00 (2006.01)
G06F 7/00 (2006.01)
G06F 17/22 (2006.01)
G06Q 10/10 (2012.01)
G06F 17/30 (2006.01)

(52) U.S. Cl.
CPC ...... *G06F 17/30011* (2013.01); *G06F 17/2288* (2013.01); *G06Q 10/10* (2013.01)
USPC .......................... 707/665; 707/769; 707/695

(58) Field of Classification Search
CPC . G06F 21/10; G06F 2221/2135; G06F 21/86; G06F 2221/0737
USPC .......................... 707/769, 695, 665
See application file for complete search history.

(56) References Cited

U.S. PATENT DOCUMENTS

| | | | |
|---|---|---|---|
| 5,481,710 A | 1/1996 | Keane et al. | |
| 5,574,846 A | 11/1996 | Yoshimura et al. | |
| 5,621,877 A | 4/1997 | Neumann et al. | |
| 5,659,747 A | 8/1997 | Nakajima | |
| 5,760,767 A | 6/1998 | Shore et al. | |
| 5,786,814 A | 7/1998 | Moran et al. | |
| 5,844,563 A | 12/1998 | Harada et al. | |
| 5,867,163 A | 2/1999 | Kurtenbach | |
| 5,870,545 A * | 2/1999 | Davis et al. | 709/201 |
| 5,883,639 A | 3/1999 | Walton et al. | |
| 5,978,836 A * | 11/1999 | Ouchi | 709/206 |
| 5,999,173 A | 12/1999 | Ubillos | |
| 6,034,683 A | 3/2000 | Mansour et al. | |
| 6,057,833 A | 5/2000 | Heidmann et al. | |

(Continued)

OTHER PUBLICATIONS

International Search Report, PCT/US2012/033953 dated Jul. 5, 2012.

(Continued)

*Primary Examiner* — Pavan Mamillapalli
(74) *Attorney, Agent, or Firm* — Patterson & Sheridan, LLP

(57) ABSTRACT

A system and technique for displaying a document's workflow history are disclosed. The system includes a graphical user interface for displaying one or more graphical representations of events generated by an application configured to edit a document. Each of the events generated by the application may be stored in a data structure that is associated with one or more portions of the document. The data structure may also be associated with a digital image that reflects the state of the document at the time the event was generated and one or more frames of digital video captured substantially simultaneously with the generation of the event. The system may display the stored events via graphical representations in the graphical user interface that represent a portion of the total document workflow history. A user may navigate through the graphical events based on a hierarchical algorithm for clustering events.

21 Claims, 21 Drawing Sheets

(56) References Cited

U.S. PATENT DOCUMENTS

| | | | |
|---|---|---|---|
| 6,108,668 A | 8/2000 | Bates et al. | |
| 6,111,575 A | 8/2000 | Martinez et al. | |
| 6,170,002 B1* | 1/2001 | Ouchi | 709/206 |
| 6,185,591 B1 | 2/2001 | Baker et al. | |
| 6,262,724 B1 | 7/2001 | Crow et al. | |
| 6,366,933 B1* | 4/2002 | Ball et al. | 715/203 |
| 6,377,964 B1 | 4/2002 | Sano | |
| 6,414,686 B1 | 7/2002 | Protheroe et al. | |
| 6,532,023 B1 | 3/2003 | Schumacher et al. | |
| 6,594,636 B1* | 7/2003 | Sakaguchi et al. | 705/7.11 |
| 6,618,851 B1 | 9/2003 | Zundel et al. | |
| 6,651,033 B2* | 11/2003 | Nemoto et al. | 702/182 |
| 6,662,226 B1 | 12/2003 | Wang et al. | |
| 6,699,127 B1 | 3/2004 | Lobb et al. | |
| 6,724,918 B1 | 4/2004 | Yen et al. | |
| 6,750,890 B1 | 6/2004 | Sugimoto | |
| 6,964,025 B2 | 11/2005 | Angiulo et al. | |
| 6,968,509 B1 | 11/2005 | Chang et al. | |
| 6,978,281 B1 | 12/2005 | Kruy et al. | |
| 7,062,497 B2 | 6/2006 | Hamburg et al. | |
| 7,065,493 B1* | 6/2006 | Homsi | 705/7.26 |
| 7,207,034 B2 | 4/2007 | Burke et al. | |
| 7,213,211 B1 | 5/2007 | Sanders et | |
| 7,357,300 B2* | 4/2008 | Hull et al. | 235/376 |
| 7,360,159 B2 | 4/2008 | Chailleux | |
| 7,424,718 B2 | 9/2008 | Dutton | |
| 7,464,137 B2 | 12/2008 | Zhu et al. | |
| 7,478,327 B1 | 1/2009 | Reid | |
| 7,565,607 B2 | 7/2009 | McGlinchey et al. | |
| 7,627,821 B2 | 12/2009 | Klementiev | |
| 7,653,721 B1 | 1/2010 | Romanov et al. | |
| 7,707,146 B2 | 4/2010 | Friedman | |
| 7,707,284 B2 | 4/2010 | Friedman et al. | |
| 7,765,480 B2 | 7/2010 | Hasegawa et al. | |
| 7,774,718 B2 | 8/2010 | Finke-Anlauff et al. | |
| 7,788,592 B2 | 8/2010 | Williams et al. | |
| 7,805,673 B2 | 9/2010 | der Quaeler et al. | |
| 7,856,424 B2 | 12/2010 | Cisler et al. | |
| 7,889,928 B2 | 2/2011 | Shieh | |
| 7,900,142 B2 | 3/2011 | Baer | |
| 7,945,142 B2 | 5/2011 | Finkelstein et al. | |
| 7,974,948 B2 | 7/2011 | Baer et al. | |
| 7,987,423 B2 | 7/2011 | Wu et al. | |
| 8,078,724 B2 | 12/2011 | Wang et al. | |
| 8,122,122 B1 | 2/2012 | Clingenpeel et al. | |
| 8,166,394 B1 | 4/2012 | Melnicki | |
| 8,209,308 B2 | 6/2012 | Rueben et al. | |
| 8,214,374 B1 | 7/2012 | Acharya | |
| 8,234,591 B1 | 7/2012 | Dhawan et al. | |
| 8,250,473 B1 | 8/2012 | Haynes et al. | |
| 8,255,799 B2 | 8/2012 | Kintzley et al. | |
| 8,311,988 B2 | 11/2012 | Cisler et al. | |
| 2001/0049704 A1 | 12/2001 | Hamburg et al. | |
| 2002/0063737 A1 | 5/2002 | Feig et al. | |
| 2002/0133315 A1* | 9/2002 | Nemoto et al. | 702/187 |
| 2003/0115333 A1 | 6/2003 | Cohen et al. | |
| 2003/0220973 A1 | 11/2003 | Zhu et al. | |
| 2004/0093564 A1 | 5/2004 | Kumhyr et al. | |
| 2004/0111488 A1 | 6/2004 | Allan | |
| 2004/0261026 A1 | 12/2004 | Corson | |
| 2005/0060719 A1* | 3/2005 | Gray et al. | 719/318 |
| 2005/0071187 A1* | 3/2005 | Zubizarreta | 705/1 |
| 2005/0281437 A1 | 12/2005 | Fruchter et al. | |
| 2005/0286428 A1 | 12/2005 | Oksanen et al. | |
| 2006/0031199 A1 | 2/2006 | Newbold et al. | |
| 2006/0156246 A1 | 7/2006 | Williams et al. | |
| 2006/0259524 A1* | 11/2006 | Horton | 707/201 |
| 2007/0022159 A1 | 1/2007 | Zhu et al. | |
| 2008/0034013 A1 | 2/2008 | Cisler et al. | |
| 2008/0034039 A1 | 2/2008 | Cisler et al. | |
| 2008/0034307 A1 | 2/2008 | Cisler et al. | |
| 2008/0072209 A1* | 3/2008 | Farrah et al. | 717/113 |
| 2008/0109717 A1 | 5/2008 | Krauter | |
| 2008/0129754 A1 | 6/2008 | Nakamura | |
| 2008/0250314 A1* | 10/2008 | Larsen | 715/705 |
| 2008/0250342 A1 | 10/2008 | Clark et al. | |
| 2009/0172533 A1 | 7/2009 | Hamzaoui et al. | |
| 2009/0177998 A1 | 7/2009 | Barrios et al. | |
| 2009/0192823 A1 | 7/2009 | Hawkins et al. | |
| 2009/0241048 A1 | 9/2009 | Augustine et al. | |
| 2009/0287658 A1 | 11/2009 | Bennett | |
| 2010/0095208 A1 | 4/2010 | White et al. | |
| 2010/0095219 A1 | 4/2010 | Stachowiak et al. | |
| 2010/0312754 A1 | 12/2010 | Bear et al. | |
| 2011/0029907 A1 | 2/2011 | Bakhash | |
| 2011/0055702 A1 | 3/2011 | Jakobson | |
| 2011/0252301 A1* | 10/2011 | Vollmer et al. | 715/229 |
| 2012/0185768 A1 | 7/2012 | Dowd | |
| 2012/0272173 A1 | 10/2012 | Grossman et al. | |

OTHER PUBLICATIONS

Abowd, et al. (1996). "Teaching and Learning as Multimedia Authoring: the Classroom", 2000 project. Proceedings of the fourth ACM international conference on Multimedia. 187-198.

Baudisch, et al. (2003). Halo: A Technique for Visualizing Off-Screen Objects, Proceedings of the SIGCHI conference on Human Factors in Computing Systems vol. No. 5, Issue No. 1, pp. 481-488.

Baudisch, et al. (2006). "Phosphor: Explaining Transitions in the User Interface Using Afterglow Effects", Proceedings of the 19th annual ACM symposium on User Interface Software and Technology pp. 169-178.

Bergman, et al. (2005). "DocWizards: A System for Authoring Follow-Me Documentation Wizards", Proceedings of the 18th annual ACM, Symposium on User Interface Software and Technology, p. 191-200.

Berlage, T. (1994). "A Selective Undo Mechanism for Graphical User Interfaces Based on Command Objects", ACM Trans. Comput.-Hum. Interact. 1(3):pp. 269-294.

Callahan, et al. (2006). "Managing the Evolution of Dataflows with VisTrails", Proceedings of the 22nd International Conference on Data Engineering Workshops, 5 pages.

Cheng, et al. (2009). "SmartPlayer: User-Centric Video Fast-Forwarding", Proceedings of the 27th international Conference on Human Factors in Computing Systems, CHI 2009 ~ Looking at Videos Apr. 7th, 2009 ~ Boston, MA, USA pp. 789-798.

Christel, et al. (1998). "Evolving Video Skims into Useful Multimedia Abstractions", Proceedings of the SIGCHI conference on Human Factors in Computing Systems CHI 98—Apr. 18-23, 1998 Papers pp. 171-178.

Derthick, et al. (2001). "Enhancing Data Exploration with a Branching History of User Operations", Knowledge-Based Systems. 14 ((1-2)): 65-74 pp. 1-23.

Dragicevic, et al. (2008). "Video Browsing by Direct Manipulation". Proceeding of the twenty-sixth annual SIGCHI Conference on Human Factors in Computing Systems pp. 237-246.

Grabler, et al. (2009). "Generating Photo Manipulation Tutorials by Demonstration", ACM Siggraph 2009 papers vol. 28, No. 3, Article 66, Aug. 2009, pp. 66:1-66:9.

Grossman, et al. ((2010-in press)). ToolClips: An Investigation of Contextual Video Assistance for Functionality Understanding ACM CHL 1April 10-15, 2010, Atlanta GA, USA, pp. 1515-1524.

Guimbretiere, et al. (2007). "ExperiScope: An Analysis Tool for Interaction Data", Proceedings of the SIGCHI Conference on Human Factors in Computing Systems Apr. 28-May 3, 2007, San Jose, CA USA pp. 1333-1342.

Hardock, et al. (1993). "A Marking Based Interface for Collaborative Writing", Proceedings of the 6th Annual ACM Symposium on User Interface Software and Technology Nov. 3-5, 1993, pp. 259-266.

Harrison, et al. (1995). "A Comparison of Still, Animated, or Non Illustrated On-Line Help with Written or Spoken Instructions in a Graphical User Interface", Proceedings of the SIGCHI Conference on Human factors in computing systems pp. 82-89.

Heer, et al. (2008). "Graphical Histories for Visualization: Supporting Analysis, Communication, and Evaluation", IEEE Transactions on Visualization and Computer Graphics. 14(6): pp. 1189-1196.

Huang, e al. (2007). "Graphstract: Minimal Graphical Help for Computers", Proceedings of the 20th Annual ACM Symposium on User Interface Software and Technology Oct. 7-10, 2007 pp. 203-212.

(56) References Cited

OTHER PUBLICATIONS

Kelleher, et al. (2005). "Stencils-Based Tutorials: Design and Evaluation", Proceedings of the SIGCHI Conference on Human Factors in Computing Systems Apr. 2-7, 2005 pp. 541-550.
Kurlander, et al. (1992). "A History-Based Macro by Example System", Proceedings of the 5th Annual ACM Symposium on User Interface Software and Technology Nov. 15-18, 1992 pp. 99-106.
Kurlander, et al. (1988). "Editable Graphical Histories", IEEE Workshop on Visual Languages pp. 127-134.
Kurlander, et al. (1990). "A Visual Language for Browsing, Undoing, and Redoing Graphical Interface Commands", Visual Languages and Visual Programming. 1990, Plenum Press. p. 257-275.
Lieberman, H. (1993). "Mondrian: A Teachable Graphical Editor", Watch what I do: programming by demonstration. 1993, MIT Press. 19 pages.
Little, et al. (2007). "Koala: Capture, Share, Automate, Personalize Business Processes on the Web", Proceedings of the SIGCHI Conference on Human Factors in Computing Systems Apr. 28-May 3, 2007 pp. 943-946.
Liu, et al. (2007). "Video collage", Proceedings of the 15th International Conference on Multimedia pp. 461-462.
Meng, et al. (1998). "Visualizing Histories for Selective Undo and Redo", Proceedings of the Third Asian Pacific Computer and Human Interaction 6 pages.
Milash, et al. (1996). "Lifelines: Visualizing Personal Histories", Proceedings of the SIGCHI Conference on Human Factors in Computing Systems: Common Ground Apr. 13-18, 1996 pp. 392-393.
Minneman, et al. (1995). "A Confederation of Tools for Capturing and Accessing Collaborative Activity", Proceedings of the third ACM International Conference on Multimedia. 523-534 18 pages.
Myers, et al. (1997). "The Amulet Environment: New Models for Effective User Interface Software Development", IEEE Trans. Softw. Eng. vol. 23, No. 6: pp. 347-365.
Myers, et al. (2006). "Answering Why and Why Not Questions in User Interfaces", Proceedings of the SIGCHI Conference on Human Factors in Computing Systems Apr. 22-27, 2006, Montreal, Quebec Canada pp. 397-406.
Mynatt, et al. (1999). "Flatland: New Dimensions in Office Whiteboards", ACM CHI Conference on Human Factors in Computing Systems May 15-20, 1999, pp. 346-353.
Nakamura, et al. (2008). "An Application-Independent System for Visualizing User Operation History", Proceedings of the 21st annual ACM Symposium on User Interface Software and Technology pp. 23-32.
Plaisant, et al. (1999). "The Design of History Mechanisms and Their Use in Collaborative Educational Simulations", Proceedings of the 1999 Conference on Computer Support for Collaborative Learning 16 pages.
Ramos, et al. (2003). "Fluid Interaction Techniques for the Control and Annotation of Digital Video", ACM UIST Symposium on User Interface Software and Technology vol. 5, Issue 2, pp. 105-114.
Rekimoto, J. (1999). "Time-Machine Computing: A Time-Centric Approach for the Information Environment", Proceedings of the 12th Annual ACM Symposium on User Interface Software and Technology vol. 1, pp. 45-54.
Su, S. (2007). "Visualizing, Editing, and Inferring Structure in 2D Graphics", UIST Doctoral Symposium Oct. 7-10, 2007, 4 pages.
Terry, et al . (2009). "ingimp: A Smorgasbord of Usability, Adaptive UIs, and Visually Arresting Graphics", Libre Graphics Meeting http://111.ingimp.org; http://hci.uwaterloo.ca pp. 1-39.
Truong, et al. (2007). "Video Abstraction: A Systematic Review and Classification", ACM Trans. Multimedia Comput. Commun. Appl. vol. 3, No. 1, ARticle 3, Feb. 2007, pp. 1-37.
Yeh, et al. (2009). Sikuli: using GUI Screenshots for Search and Automation, Proceedings of the 22nd Annual ACM Symposium on User Interface Software and Technology Oct. 4-7, 2009, pp. 183-192.
Office Action dated Dec. 6, 2012, U.S. Appl. No. 13/090,150, filed Apr. 19, 2011, 12 pages.
Office Action dated Dec. 10, 2012, U.S. Appl. No. 13/090,144, filed Apr. 19, 2011, 15 pages.
Office Action dated Dec. 10, 2012, U.S. Appl. No. 13/090,153, filed Apr. 19, 2011, 15 pages.
Office Action dated Jan. 4, 2013, U.S. Appl. No. 13/090,148, filed Apr. 19, 2011, 12 pages.

\* cited by examiner

HIERARCHICAL DISPLAY AND NAVIGATION OF DOCUMENT REVISION HISTORIES

BACKGROUND OF THE INVENTION

1. Field of the Invention

The invention relates generally to computer software and, more specifically, to the hierarchical display and navigation of document revision histories.

2. Description of the Related Art

Users create documents in a variety of different applications, such as word processors, spreadsheets, image editors, and computer-aided design (CAD) applications. A revision history of a document is typically thought of as the set of ordered operations a user has performed in the application to create or modify contents of the document. One useful aspect of a revision history is the ability to undo, redo, or modify an operation that is stored in the revision history. Some applications discard a revision history when the document is either saved or closed, while other applications store the revision history along with the document. A revision history is typically visualized or navigated using one of many available techniques, such as textual lists, instructions presented in natural language, enhanced screen shots, before-and-after thumbnails, animations or videos.

One drawback to an approach for displaying a document revision history implemented by many applications is that user operations are not grouped based on a hierarchical system. For complex applications, the number of user operations stored in a revision history can become quite large. Typically, each of the user operations is displayed in a similar manner to all other user operations and navigating through all the user operations may become difficult. Another drawback of many applications that store a revision history of a document is that the ability to utilize the information stored for a user operation may be limited. For example, in some applications, operations based on the document revision history may be limited to undoing the last user operation. Yet another drawback to current approaches for displaying a document revision history is that, for example, simply listing the document revision history may not provide a user with enough information to understand why a series of revisions were made, but merely informs the user which revisions resulted in the final document.

As the foregoing illustrates, what is needed in the art is an effective mechanism for displaying, navigating and interacting with information stored in a complete revision history of a document.

SUMMARY OF THE INVENTION

One example embodiment of the present invention sets forth a method for capturing a workflow history of an electronic document. The method includes the steps of receiving an event generated by an application that is configured to modify the document, generating a data object that includes information related to the event, capturing a digital image that reflects a state of the document at a point in the workflow history of the document corresponding to when the application generated the event, associating the data object with a portion of the document modified as a result of the event as well as the digital image, and storing the data object and the digital image in a memory.

Another example embodiment of the present invention sets forth a computer readable storage medium containing a program which, when executed, performs an operation for capturing a workflow history of an electronic document. The operation includes the steps of receiving an event generated by an application that is configured to modify the document, generating a data object that includes information related to the event, capturing a digital image that reflects a state of the document at a point in the workflow history of the document corresponding to when the application generated the event, associating the data object with a portion of the document modified as a result of the event as well as the digital image, and storing the data object and the digital image in a memory.

Yet another example embodiment of the present invention sets forth a system for capturing a workflow history of an electronic document. The system includes a memory and a processor coupled to the memory and configured to receive an event generated by an application that is configured to modify the document, generate a data object that includes information related to the event, capture a digital image that reflects a state of the document at a point in the workflow history of the document corresponding to when the application generated the event, associate the data object with a portion of the document modified as a result of the event as well as the digital image, and store the data object and the digital image in the memory.

One advantage of the disclosed approach is that the system provides a flexible and intuitive approach for displaying and navigating the revision history of a document. Even a large revision history that includes hundreds of user operations may be reduced to a simple graphical representation that may be navigated by a user to visualize the revision history at finer and finer detail. A user may use tools within the system to filter or search the revision history for particular types of user operations. The hierarchical, high-level clustering algorithm also presents each of the user operations within the context of the complete revision history, allowing a user to visualize and learn various techniques for creating or modifying the content of a document. In addition, captured video content associated with the revision history may be played back to provide the user context within the application of how a document was revised.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
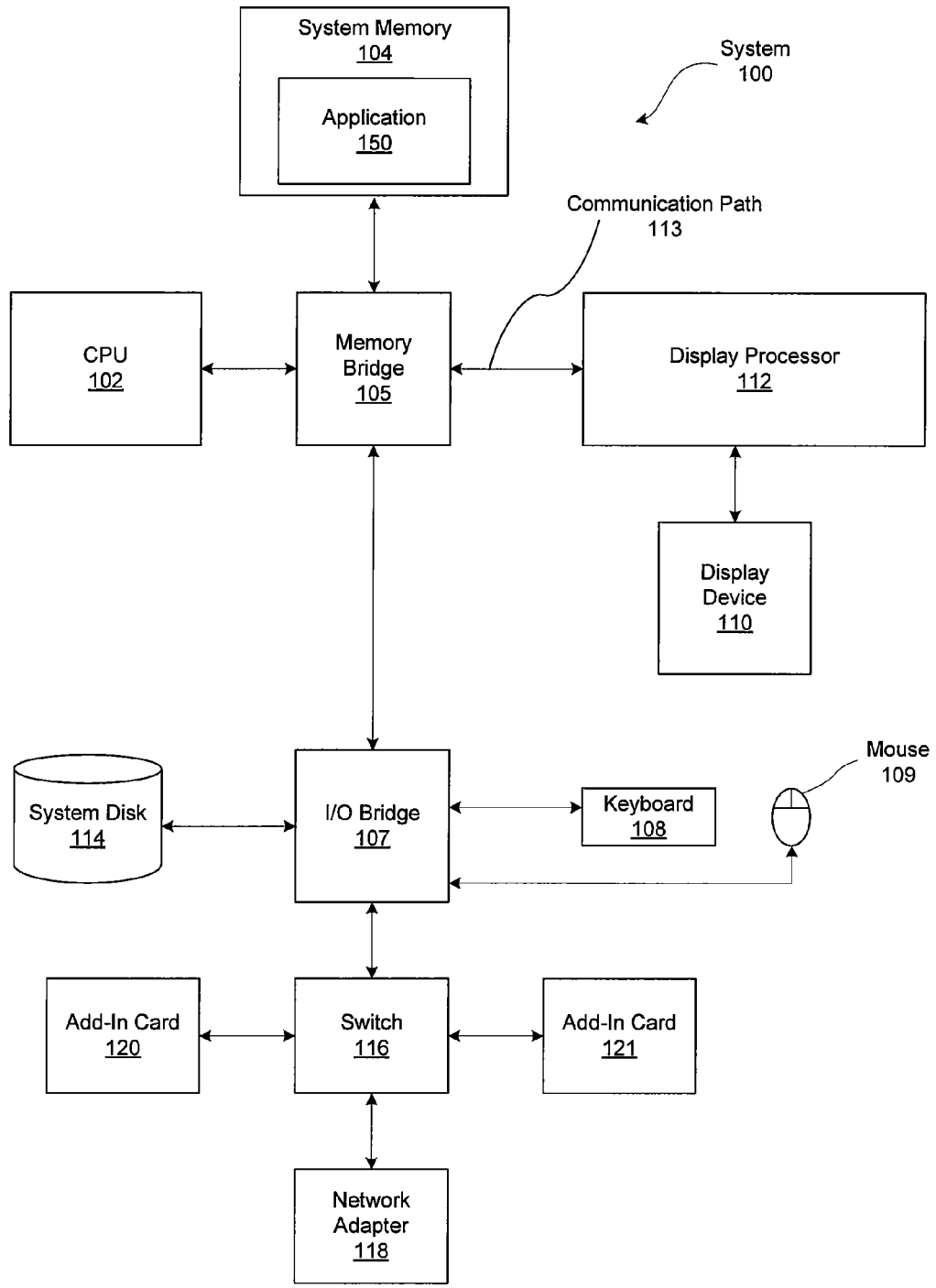
FIG. 1 is a block diagram of a system configured to implement one or more aspects of the present invention.

FIG. 1 is a block diagram of a system 100 configured to implement one or more aspects of the present invention. System 100 may be a computer workstation, personal computer, or any other device suitable for practicing one or more embodiments of the present invention. As shown, system 100 includes one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 112 periodically delivers pixels to a display device 110 that may be any conventional CRT or LED monitor. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data.

These rendered images may be stored on computer-readable media in a digital format and optionally returned to system 100 for display.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or a graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

In one embodiment, application 150 is stored in system memory 104. Application 150 may be any application configured to display a graphical user interface (GUI) on display device 110. Application 150 may be configured to generate and modify documents based on input received from a user. For example, application 150 may be a word processing application or an image editing program.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Figure 2:
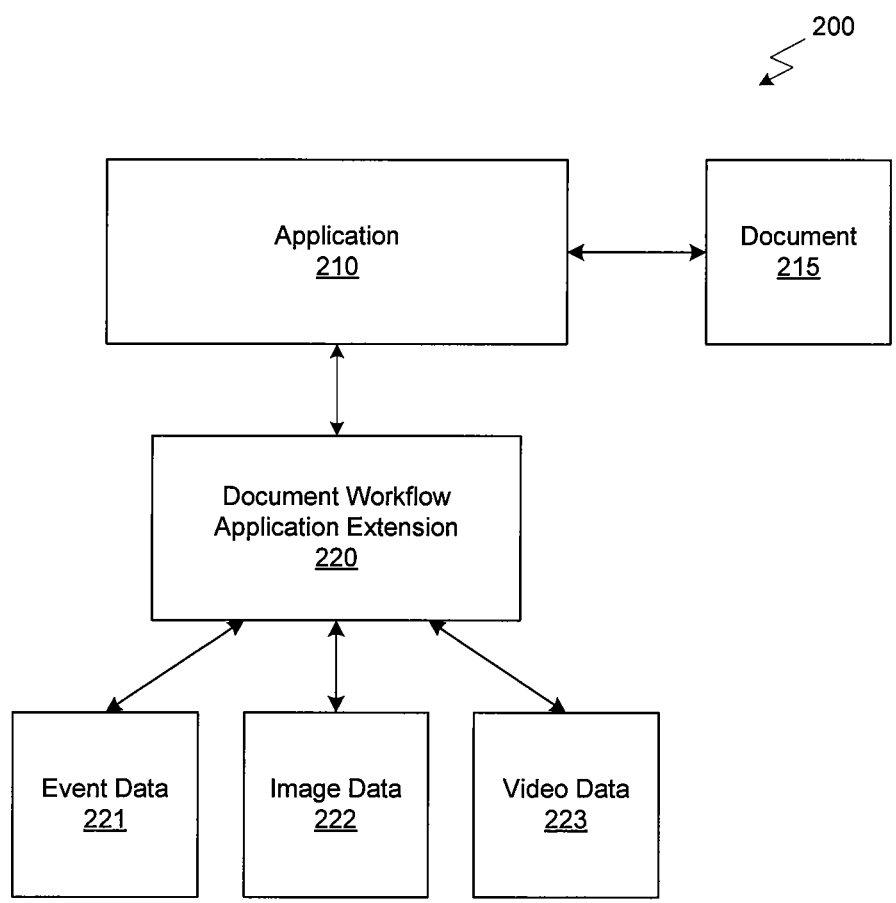
FIG. 2 illustrates a conceptual diagram of an application framework for generating and displaying document workflow histories, according to one embodiment of the present invention.

FIG. 2 illustrates a conceptual diagram of an application framework 200 for generating and displaying document workflow histories, according to one embodiment of the present invention. As shown, computer system 100 includes application 210 that is a modified version of application 150 that is configured to interface with a document workflow application extension 220. For example, application 210 may be based on the Paint.NET application (i.e., an open-source raster based image editing application written in the C# programming language). In one embodiment, application 210 is designed to transmit messages to the document workflow application extension 220 whenever an event is generated, such as when a user makes a change to an image or changes one or more settings in a dialog box. The message may contain information related to the event such as a timestamp or a screenshot of the application window at a time corresponding to the generation of the event. In another embodiment, application 210 may store a list of events internally and the document workflow application extension 220 may be configured to poll application 210 to retrieve information related to the list of events. It will be appreciated that application 210 may be modified in one or more other technically feasible ways in order to provide the specific functionality necessary to implement one or more aspects of the present invention, as described below. In yet another embodiment, a user may be able to control, explicitly, whether the document workflow application extension 220 monitors events generated by application 210. In this manner, a revision history for a document may contain information about only a particular portion of the document's life.

Application 210 may be designed to generate and edit documents, images, videos, or any other type of user defined content. A user may generate document 215 via application 210 and store document 215 in system memory 104 or on system disk 114. In one embodiment, document 215 is an image stored in a compressed file format, such as the JPEG image file format. In alternative embodiments, document 215 may be a text document, such as a Microsoft Word™ document file. In other embodiments, document 215 may be media content such as a video file compressed using an MPEG codec. In yet other embodiments, document 215 may be a computer-aided design (CAD) model. The CAD model may be an assembly of one or more parts that include defined volumes, surfaces or vertices. The application framework 200 is configured to capture and store the document workflow history (i.e., document revision history) for one or more documents created or modified with application 210.

In one embodiment, the document workflow history may include one or more operations used to modify document 215 as well as a timestamp that reflects a point in time that the operations were executed. The document workflow history may also include digital images or digital video that reflects a state of the document 215 as a result of executing the operations. A user may navigate through graphical representations of the document workflow history to visualize the steps taken to create the associated document 215. In another embodiment, the document workflow history may include a subset of operations that directly result in a modification to document 215.

Document workflow application extension 220 may implement an application programming interface (API). The document workflow application extension 220 receives notifications of events generated by application 210 and stores the events in a data object in event data 221. In one embodiment, document workflow application extension 220 generates an data object in event data 221 for each event generated by application 210. The data object in event data 221 may include information related to the event as well as a timestamp corresponding to when that particular event was generated by the application 210. The timestamp may be an absolute time, such as a time related to the computer clock of computer system 100, or a relative time, such as an elapsed time since document 215 was created.

Document workflow application extension 220 may also be configured to capture a screenshot (i.e., a digital image) of the main application window when an event is generated. These screenshots may be stored in image data 222 and may be associated with one or more data objects in event data 221. In one embodiment, each screenshot is stored in a compressed file format such as a JPEG file format. In alternative embodiments, the bit depth of the captured image may be reduced to minimize the size of the memory required to store image data 222. For example, the screen resolution of display device 110 in the native application environment may be 800×600 at 24 bpp (bits per pixel). Such a resolution corresponds to each color component (e.g., Red, Green, and Blue) being encoded with 8 bits. In contrast, the screenshot may be stored in a 16 bpp color depth such as by using a 565 mode where the red and blue channels are each encoded with 5 bits and the green channel is encoded with 6 bits. Using a reduced color depth to store image data 222 may reduce the memory requirements of system 100. In another embodiment, metadata associated with the screenshot may be stored along with the screenshot in image data 222. Such metadata may be included in the digital image file and may identify one or more data objects in event data 221 associated with the screenshot.

Document workflow application extension 220 may also be configured to capture video data 223 associated with the document 215. For example, document workflow application extension 220 could be configured to capture one or more frames of digital video that, when played back, display a dynamic state of document 215 during the generation of the events stored in the document workflow history. In one embodiment, document workflow application extension 220 may capture a plurality of screenshots of the main application window of application 210 at a frame rate of 10 frames per second. Each screenshot corresponds to one frame of video data 223. Document workflow application extension 220 may store video data 223 in a lossless video format or a compressed format such as by encoding video data 223 using an MPEG-2 video encoder or an H.264/MPEG-4 Advanced Video Coding (AVC) encoder.

In one embodiment, a file header of a document 215 will be modified by the document workflow application extension 220 when a document revision history has been created by the document workflow application extension 220. The document 215 header may include a tag in the header that specifies that a document workflow history associated with the document is stored in a memory and include pointers to any associated metadata such as event data 221, image data 222, or video data 223 that are included in the document workflow history.

In one embodiment, application 210 and document workflow application extension 220 are separate processes executing in a multitasking operating system environment on CPU 102. In another embodiment, application 210 and document workflow application extension 220 may be included within a single process executing on CPU 102. Application 210, document 215, document workflow application extension 220, event data 221, image data 222, and video data 223 may all be stored locally in system memory 104 during execution. It will be appreciated that in some embodiments, document 215, event data 221, image data 222, and video data 223 may be written to system disk 114 or other non-volatile storage connected to computer system 100 and paged into system memory 104 as needed. Alternatively, such data may be stored remotely on a server located on the Internet and accessed remotely via network adapter 118.

In one embodiment, a user may use the document workflow application extension 220 to search stored document revision histories for a plurality of saved documents 215. For example, a user may be interested in finding other documents 215 that include a revision made with a specific tool, such as a line tool. A user may submit a query to the document workflow application extension 220 which then searches through multiple sets of event data 221 associated with different documents 215 and returns a subset of documents 215 that include an entry in event data 221 related to the line tool. In this way, a user may quickly search through a database of documents 215 to find examples of work related to specific tools of the application 210.

Figure 3A:
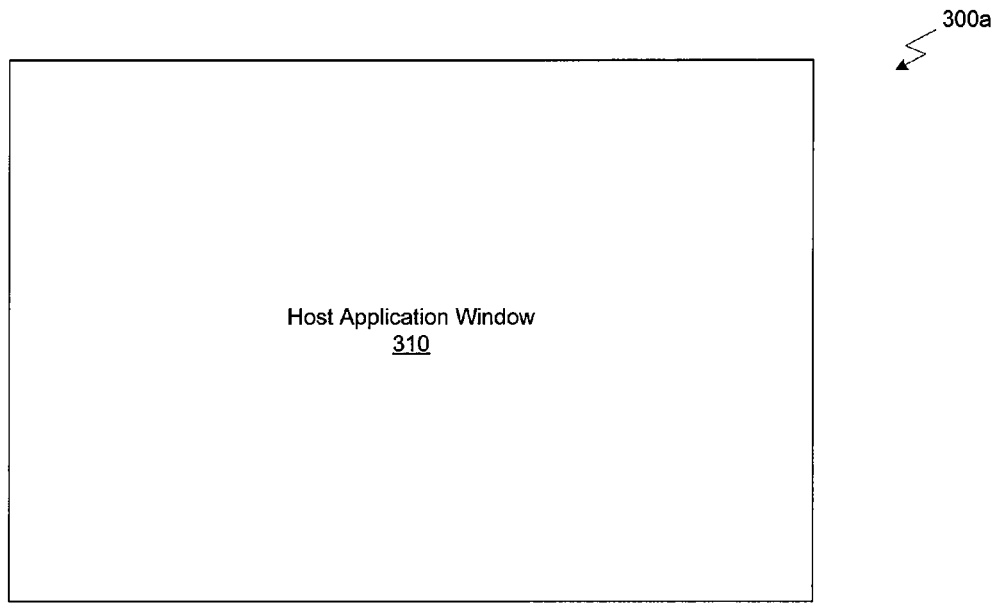
FIGS. 3A-3C illustrate a graphical user interface associated with the application framework of FIG. 2, according to one embodiment of the present invention.
Figure 3B:
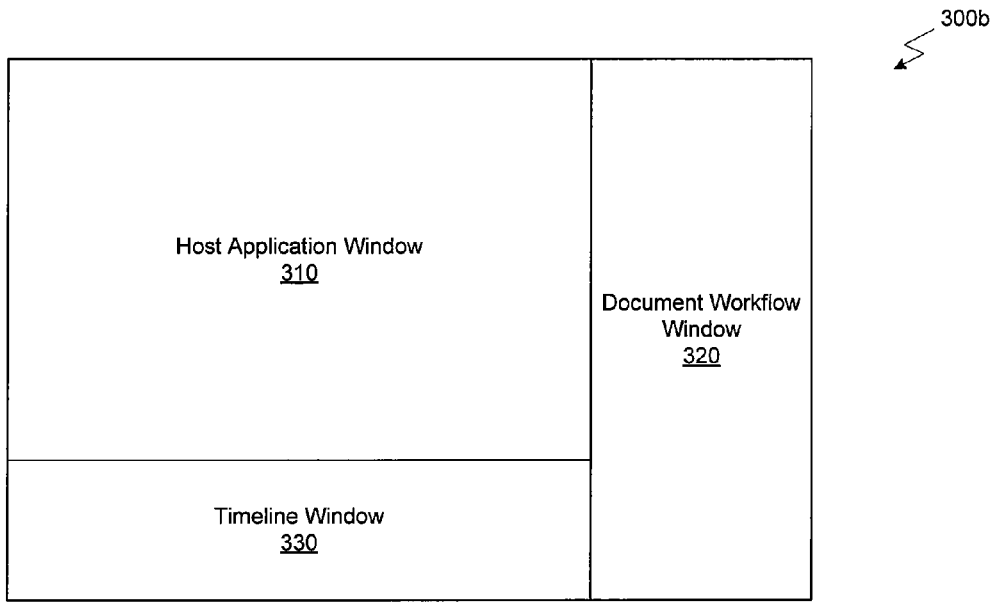
Figure 3C:
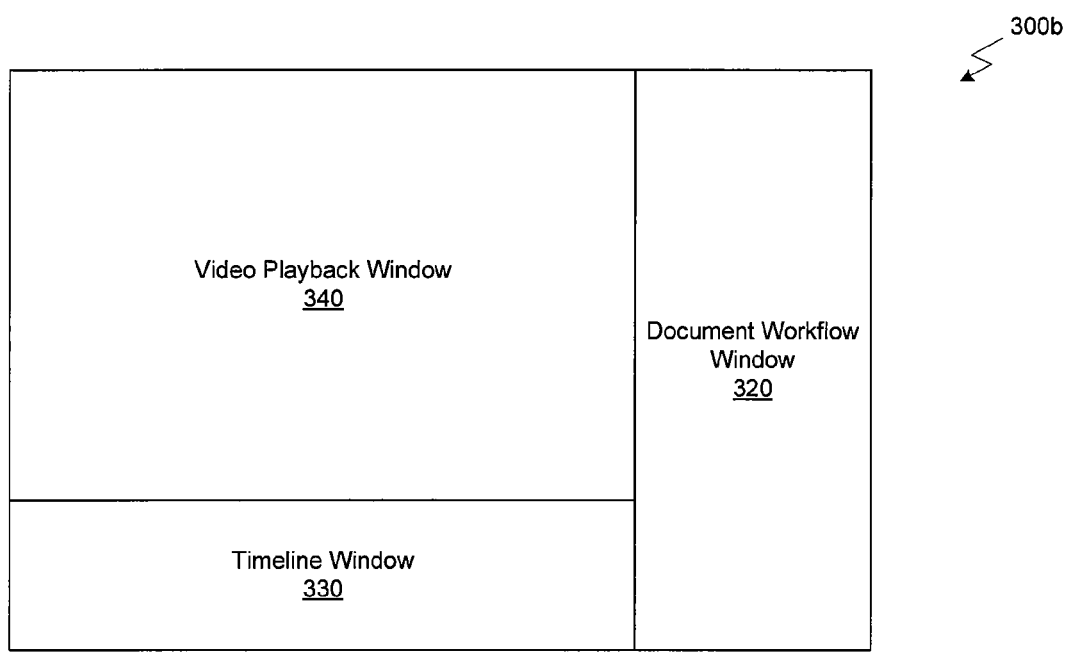

FIGS. 3A-3C illustrate a graphical user interface 300 associated with the application framework 200 of FIG. 2, according to one embodiment of the present invention. As shown in FIG. 3A, application 210 causes a host application window 310 to be displayed on display device 110. The host application window 310 may provide a user with a GUI that provides functionality to generate or modify the contents of document 215. For example, the GUI may include menus, toolbars, a document frame, and one or more dialog boxes. In one embodiment, the host application window 310 includes a document frame that displays a single document to be modified by a user. In alternative embodiments, host application window 310 may be configured to display two or more documents 215 simultaneously in two or more child frames (not shown) within the host application window 310 such that a user may modify multiple documents 215 substantially simultaneously. A screenshot of host application window 310, according to one embodiment of the present invention, is described below in connection with FIG. 5.

In one embodiment, document workflow application extension 220 may be executing as a process in the background of computer system 100 while a user is generating or modifying document 215 via application 210. Document workflow application extension 220 is configured to store information related to events in event data 221 in order to capture the document workflow history of document 215. Document workflow application extension 220 generates data objects in event data 221, stores screenshots of host application window 310 in image data 222, and stores one or more frames of digital video in video data 223 as well as creating associations between the data objects in event data 221, the screenshots in image data 222, and the frames of digital video in video data 223. For example, document workflow application extension 220 may store metadata along with a screenshot in image data 222 that associates the screenshot with a data object in event data 221. More detailed information about the generation and storage of event data 221, image data 222, and video data 223 is set forth below in conjunction with a description of FIG. 4.

Document workflow application extension 220 may enable a user to view the document workflow history in a hierarchical, graphical representation. In one embodiment, a GUI associated with document workflow application extension 220 may be displayed on display device 110 in response to a user command. In another embodiment, the GUI associated with the document workflow application extension 220 may be displayed automatically whenever a document 215 associated with a stored document revision history is opened in application 210. As shown in FIG. 3B, GUI 300b may be displayed on display device 110. GUI 300b includes the host application window 310 of GUI 300a that is resized to enable a document workflow window 320 and a timeline window 330 to be displayed on display device 110 proximate to the host application window 310. Document workflow window 320 may include one or more graphical representations of events included in the document workflow history of document 215. The graphical representations may be associated with a hierarchy such that the user may browse through the entire document workflow history at finer and finer levels of detail. A document workflow window 320, according to one embodiment of the present invention, is described below in connection with FIG. 6A.

Timeline window 330 may be configured to display a timeline object that includes one or more tracks of information related to the events generated by application 210. Each track of information may include one or more marker objects corresponding to events that were generated by application 210. The timeline object may be configured such that the marker objects are arranged on the timeline object in a chronological order. Timeline window 330 may also include a timeline marker that identifies a position in video data 223 that is currently displayed. As the timeline marker is moved to a point in the timeline window 330 that corresponds to a previous state of document 215, a frame of video data 223 that is associated with a position of the timeline marker may be overlaid on top of host application window 310. Timeline window 330 may also include one or more video controls that allow a user to play, rewind, or fast forward video data 223.

As shown in FIG. 3C, video playback window 340 may be displayed directly over host application window 310. Document workflow application extension may cause one or more frames of digital video from video data 223 to be displayed in video playback window 340. The digital video reflects the dynamic state of document 215 over the document workflow history of the document 215. The timeline marker in timeline window 330 may be positioned at a location in the timeline window 330 that corresponds to the frame of digital video currently displayed in video playback window 340. A screenshot of timeline window 330, according to one embodiment of the present invention, is described below in connection with FIG. 10. In alternative embodiments, the application 210 may be utilized to change the actual state of document 215 to reflect a previous point in the document revision history using stored information about past events in event data 221.

In one embodiment, document workflow application extension 220 may be configured to play back only select portions of the digital video, fast-forwarding through portions that are not particularly interesting to a user. For example, document workflow application extension may be configured to play back a first portion of video data 223 in response to a user selecting an event in the document workflow history. Document workflow application extension 220 may be configured to only play back those portions of video data 223 that are associated with data objects in event data 221 that correspond to events of the same type as the selected event. For example, the selected event may correspond to an operation where a user drew graphics objects on a digital canvas using a paintbrush tool in application 210. Document workflow application extension 220 may be configured to playback each portion of video data 223 that is associated with an event related to the paintbrush tool. Document workflow application extension 220 may analyze video data 223 and fast-forward through portions of video data 223 that are not related to any events related to the paintbrush tool. Consequently, the user may view a digital video that shows the state of document 215 around each event related to the paintbrush tool. In other embodiments, document workflow application extension 220 may filter the video data 223 based on one or more filter criteria selected by a user. In yet other embodiments, document workflow application extension 220 may filter the video data 223 based on one or more search terms entered in a search query. For example, a user may search video data 223 for any portions of the digital video related to a "paintbrush tool" search query.

Figure 4A:
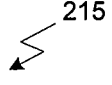
FIGS. 4A-4C illustrate the generation of data objects in event data based on events generated by application, according to one example embodiment of the present invention.
Figure 4B:
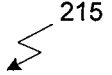
Figure 4C:
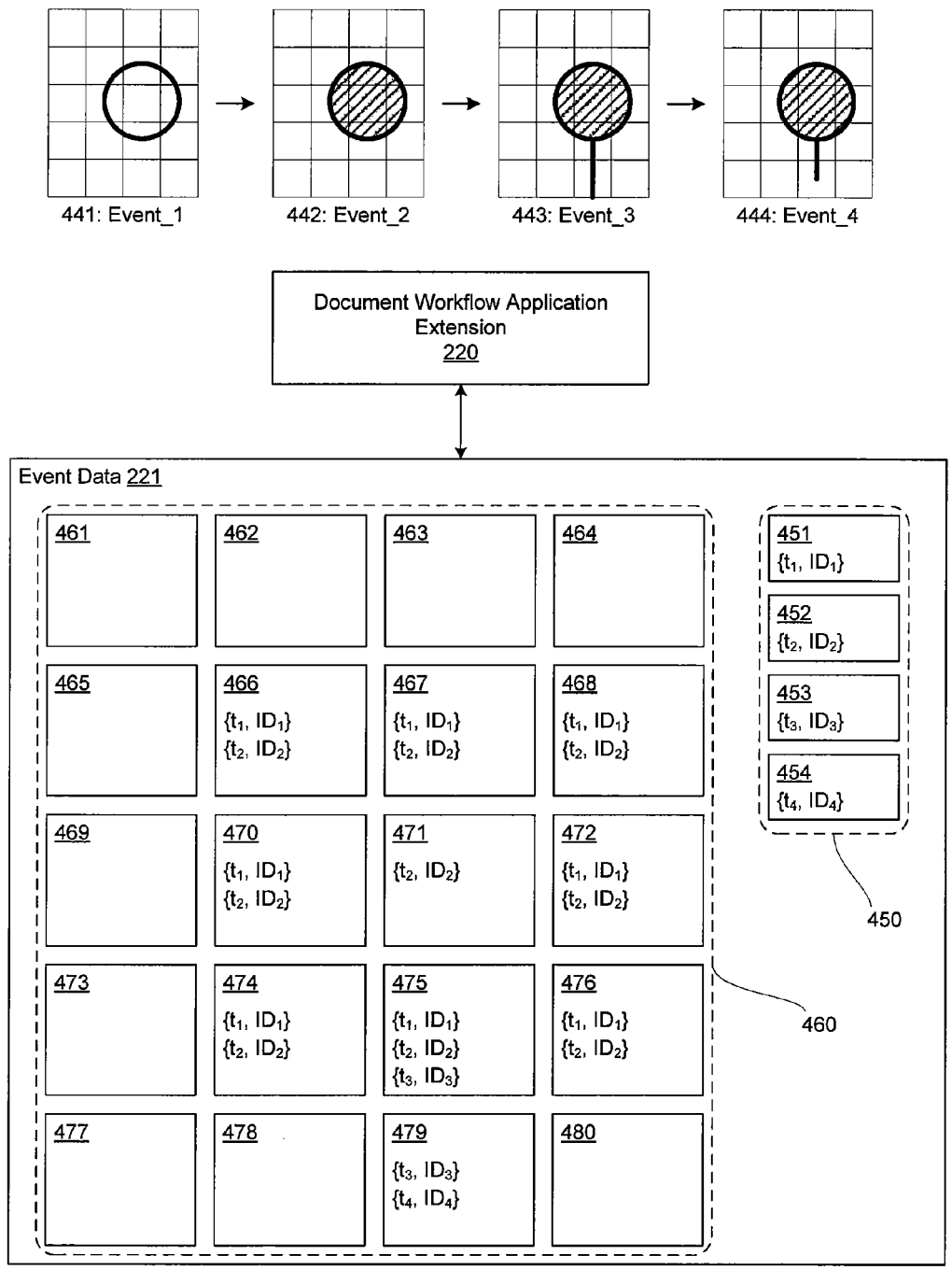

FIGS. 4A-4C illustrate the generation of data objects in event data 221 based on events generated by application 210, according to one example embodiment of the present invention. As shown in FIG. 4A, document 215 may be divided into a number of discrete parts such that document workflow application extension 220 may associate data objects corresponding to an event with one or more portions of the document 215. In one embodiment, document 215 is a digital image such as a bitmap with a resolution of 300 dpi (dots per inch). The digital image may be divided into n×m cells, such as cells 411-430, with each cell representing one or more pixels of the digital image. Although a cell size of a single pixel may be desired, the optimal cell size for a given system may depend on overall processing capacity and memory storage capabilities. Consequently, each cell may be sized based on one or more system characteristics. For example, for the computer system 100 as described in connection with FIG. 1, each cell 411-430 may correspond to a block of pixels that is 4 pixels wide by 4 pixels high (i.e., 16 pixels).

Once a user opens or creates a document 215 in application 210, document workflow application extension 220 generates a data object corresponding to each event generated by application 210. For example, application 210 may be a Paint.Net software application used for editing digital image documents. A user may select a line tool within the Paint.NET application environment and draw on a portion of an image. Document workflow application extension 220 may receive a message from the Paint.NET application indicating that the user generated a graphical object in the image with the line tool. In response to receiving this message, the document workflow application extension 220 may check the image to determine which cells in the image have been modified as a result of the user generating a graphical object with the line tool. In one embodiment, document workflow application extension stores the state of each pixel in the image. When document workflow application extension 220 receives a message related to the generation of an event, the document workflow application extension 220 compares the pixels of the image with the stored state of each pixel in the image. If any pixels in a cell are different, then document workflow application 220 associates the data object corresponding to the event with that cell of the image.

A user may add a graphic object 410 to document 215. As shown in FIG. 4B, the graphic object 410 is associated with cells 416, 417, 418, 420, 422, 424, 425, and 426. Application 210 generates an event in response to the user generating graphic object 410. In response to receiving a message related to the event, document workflow application extension 220 generates a data object in event data 221 corresponding to the event. The data object in event data 221 may include information about the event, such as an ID of the active layer or particular tool selected as well as a timestamp that indicates a time corresponding to the generation of the event. The types of events that may cause an entry to be generated in event data 221 may include tool changes, color changes, setting changes, save events, mouse clicks, and document navigations. One of skill in the art will readily appreciate that other types of events may also cause a data object to be generated in event data 221 and that other types of events are contemplated as being within the scope of the present invention.

As shown in FIG. 4C, event data 221 may include data objects 451, 452, 453 and 454 in an array 450 that correspond to one or more events recorded by document workflow application extension 220. For example, event data 221 could include data objects associated with four separate events 441, 442, 443 and 444 in the document workflow history of document 215. A first event 441 corresponds with a user drawing a circle on a digital canvas of document 215. A second event 442 corresponds with the user filling the circle with a solid color. A third event 443 corresponds with the user drawing a line. A fourth event 444 corresponds with the user editing the length of the line generated in the third event 443.

Document workflow application extension 220 generates data objects in array 450 corresponding to each of the events 441, 442, 443 and 444. Data object 451 corresponds to the first event 441, data object 452 corresponds to the second event 442, data object 453 corresponds to the third event 443, and data object 454 corresponds to the fourth event 444. Each data object 451, 452, 453, and 454 in event data 221 may include information related to the corresponding event such as an ID of the tool used to generate a graphical object, an ID of a tool setting that was changed, a timestamp corresponding to a time associated with the event, a pointer to a screenshot in image data 222 showing a state of document 215 at the time of the event, or other data related to the event. In one embodiment, document workflow application extension 220 may generate a timestamp, ID pair to include in the data object that uniquely identifies the event.

Document workflow application extension 220 may also add pointers to the data objects to slots in an n×m array 460 that associates the data objects 451, 452, 453 and 454 with any cells (411, 412, etc.) in document 215 that were changed as a result of the corresponding event. As shown, the first event 441 causes changes to cells 416, 417, 418, 420, 422, 424, 425, and 426. Consequently, document workflow application extension 220 may add a pointer for data object 451 into slots 466, 467, 468, 470, 472, 474, 475, and 476 of array 460. Similarly for event 442, document workflow application extension 220 may add a pointer for data object 452 into slots 466, 467, 468, 470, 471, 472, 474, 475, and 476 of array 460. For event 443, document workflow application extension 220 may add a pointer for data object 453 into slots 475 and 479. For event 444, document workflow application extension 220 may add a pointer for data object 454 into slot 479.

Other embodiments extending the functionality of different types of applications are contemplated as being within the scope of the present invention. The cells (411, 412, etc.) described above are one possible solution for an image editing application where the contents of document 215 may be efficiently partitioned on a 2D grid of cells. However, other embodiments may describe "cells" as various parts of a document 215. For example in a 3D CAD program, a "cell" may be each of the geometric primitives stored in the 3D CAD model (i.e., the document 215). The geometric primitives may include lines, surfaces, points, etc. After each event is detected by the document workflow application extension 220, each of the geometric primitives may be checked to determine whether the event resulted in a change of any attribute of the geometric primitive. If an attribute was changed, then document workflow application extension 220 may create a new entry in event data 221 corresponding to the associated "cell" (i.e., geometric primitive).

In one embodiment, document workflow application extension 220 may be configured to capture a screenshot of host application window 310 each time an event is generated by application 210. The screenshot may be stored in image data 222 and a pointer to the captured screenshot may be included in a corresponding data object in array 450. In other embodiments, document workflow application extension 220 may crop the captured screenshot to display only the cells of document 215 changed by the corresponding event and store the cropped screenshot in image data 222.

In another embodiment, document workflow application extension 220 may be configured to continuously capture video data 223 that reflects the document workflow history of the document 215. Document workflow application extension 220 may be configured to capture video at 10 fps using any technically feasible technique known in the art. In one embodiment, document workflow application extension 220 may process the captured video data, adding a graphical overlay to indicate the position of the mouse or to indicate one or more keys that were pressed on the keyboard, and store the processed video data in video data 223.

Figure 5:
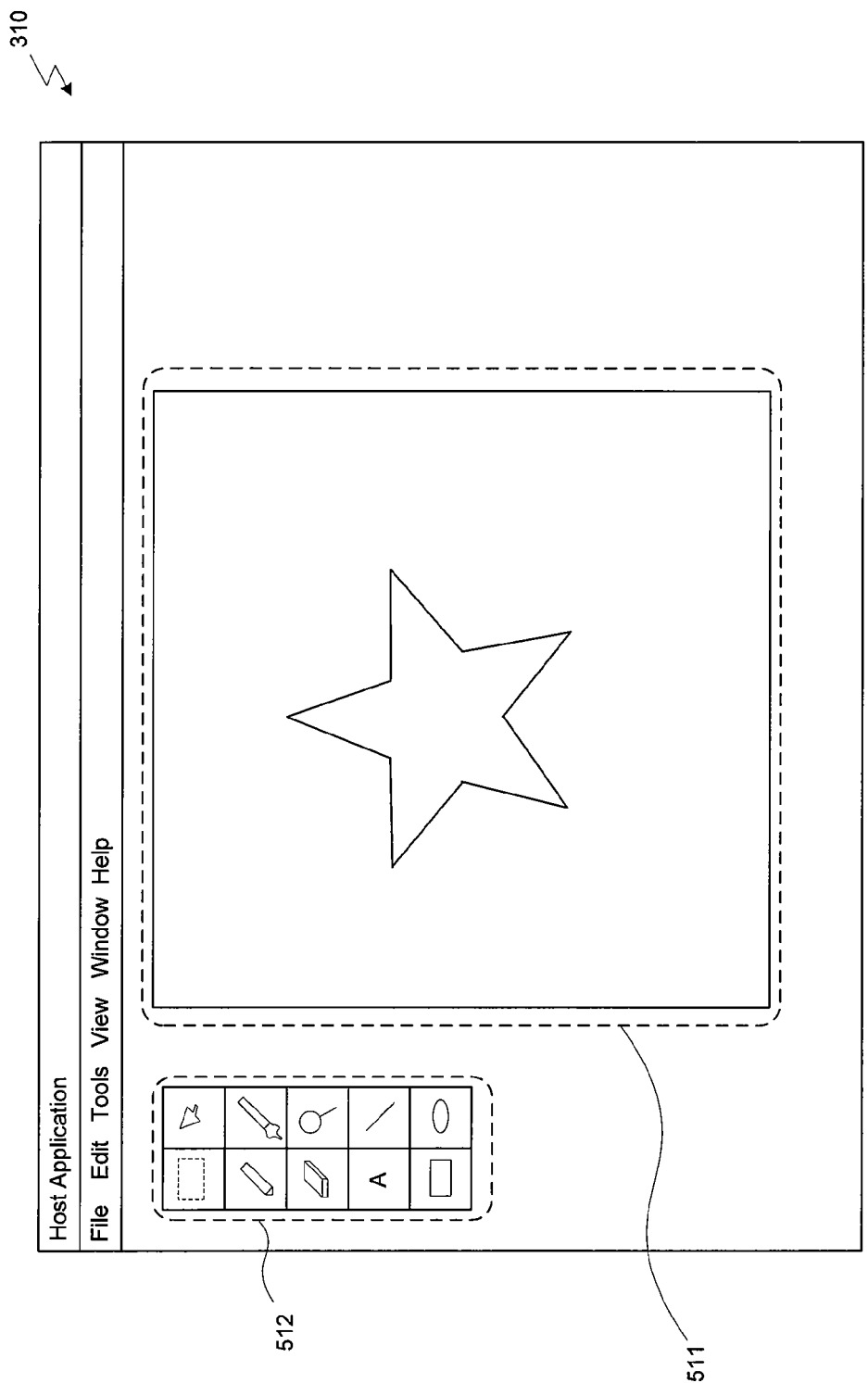
FIG. 5 illustrates a graphical user interface displayed in the host application window, according to one example embodiment of the present invention.

FIG. 5 illustrates a graphical user interface displayed in the host application window 310, according to one example embodiment of the present invention. As shown in FIG. 5, the host application window 310 may display a GUI of application 210. The host application window 310 includes a document frame 511 and a drawing toolbar 512. A user may use various tools included in the drawing toolbar 512 to create a digital image on the canvas in the document frame 511. Although one or more aspects of the present invention are illustrated using an image editing application, it will be appreciated that any other technically feasible software application capable of generating and editing documents or media content may be implemented within application framework 200.

Figure 6A:
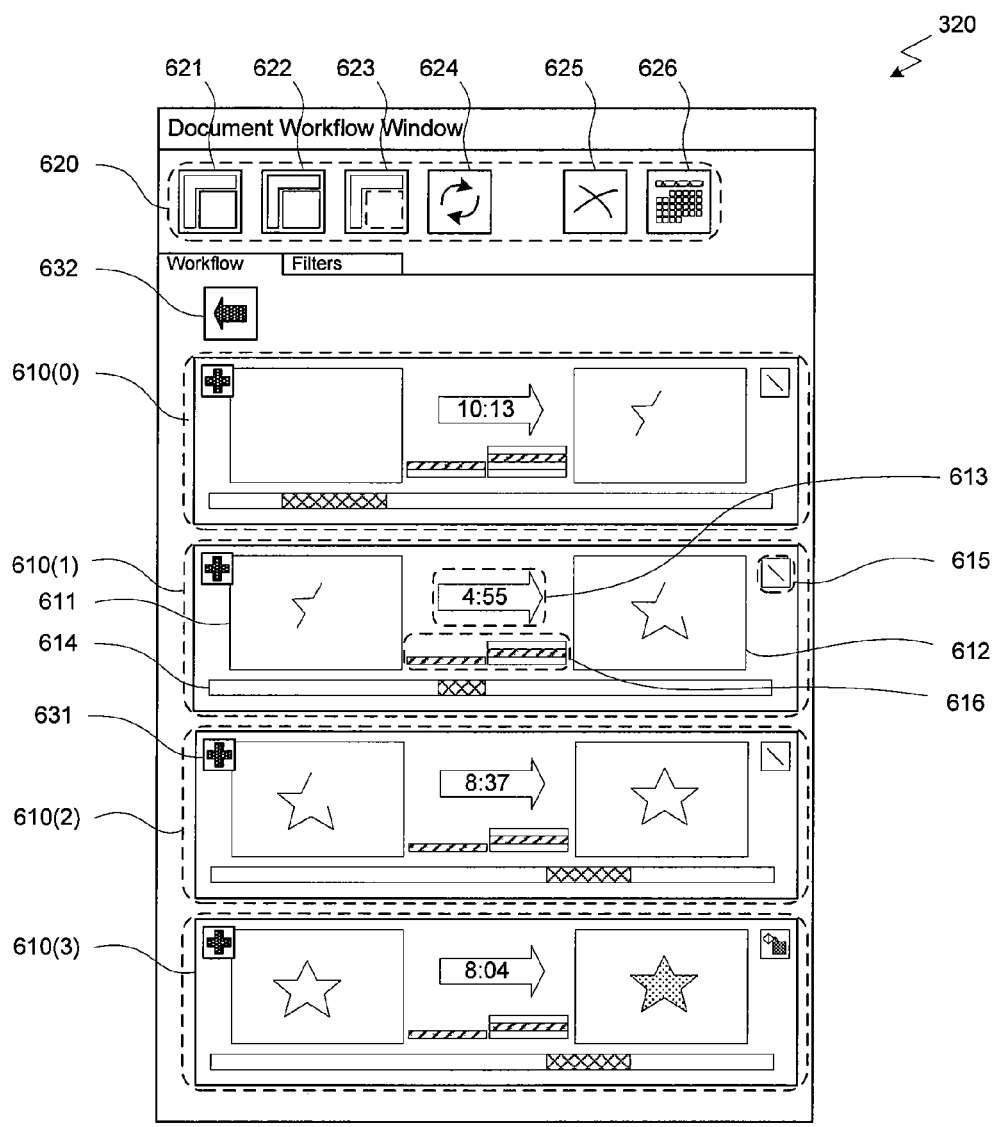
FIGS. 6A-6B illustrate the document workflow window, according to one example embodiment of the present invention.
Figure 6B:
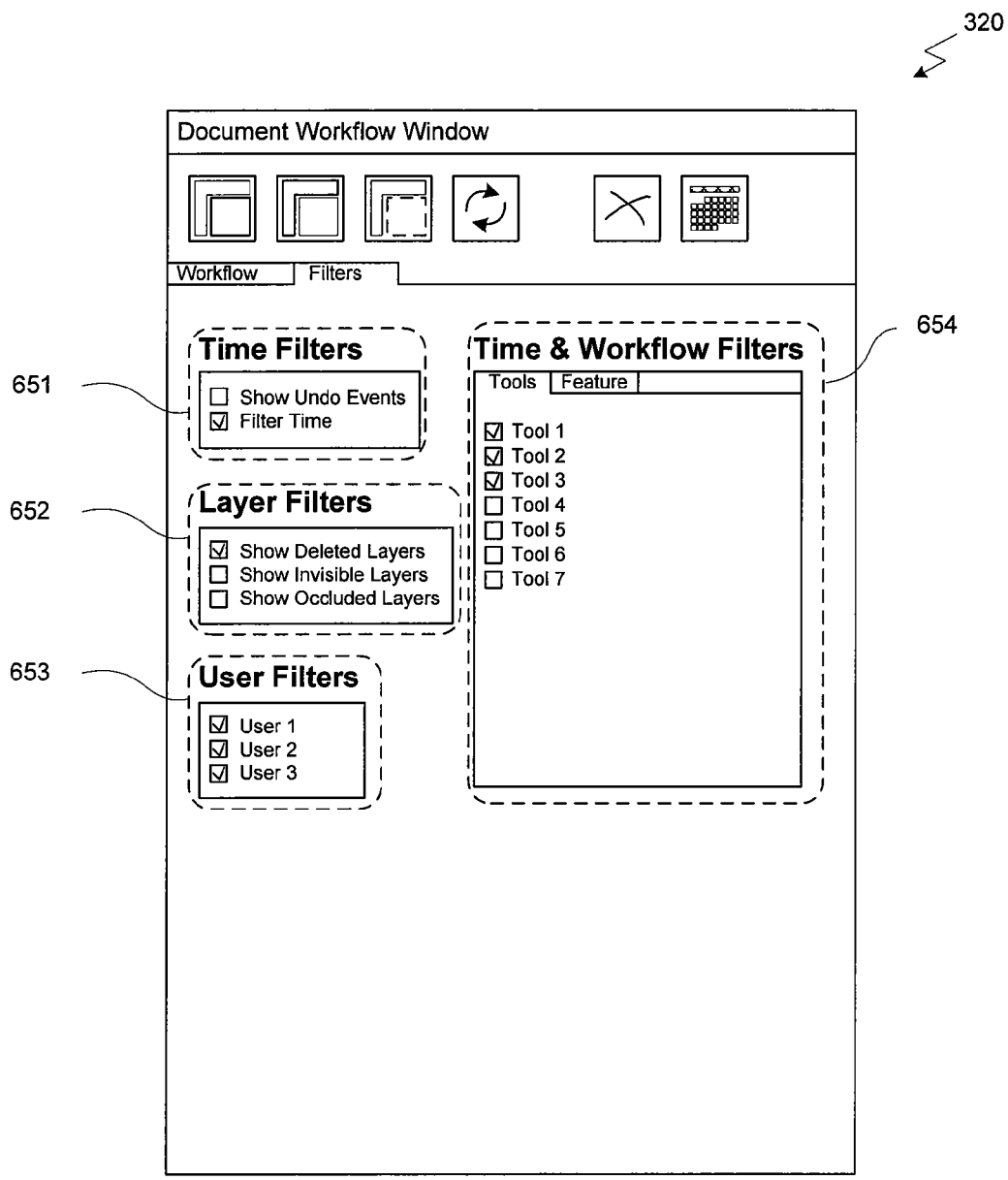

FIGS. 6A-6B illustrate the document workflow window 320, according to one example embodiment of the present invention. As shown, document workflow window 320 includes one or more graphical representations 610 of events as well as one or more user interface elements 620. Each graphical representation 610 represents a portion of the workflow history of document 215. In one embodiment, document workflow application extension 220 may cause document workflow window 320 to be displayed in response to a user command, such as pressing a hotkey or clicking a user interface element in application 210. In order to generate the one or more graphical representations 610 in document workflow window 320, document workflow application extension 220 implements a hierarchical clustering algorithm that groups one or more data objects in event data 221 into one or more clusters of events. A cluster of events may include a subset of data objects from the plurality of data objects corresponding to events generated by application 210. For example, a cluster of events may correspond to each data object associated with a timestamp between a first time associated with a first save event and a second time associated with a second save event.

The hierarchical clustering algorithm takes a list of times as input and outputs a subset of times for use as delimiters to determine the subset of data objects that is included in the cluster of events. In one embodiment, document workflow application extension 220 searches through data objects (451, 452, etc.) in array 450 to determine whether there are any data objects related to save events. For each data object related to a save event, document workflow application extension 220 adds the timestamp included in the data object to the list of times to pass to the next step in the hierarchical clustering algorithm. Document workflow application extension 220 then determines if more than a threshold number of data objects are related to save events. For example, document 215 may have been saved 10 times and, consequently, there may be 10 corresponding data objects in event data 221. If there are more than a threshold number of data objects related to save events, then the document workflow application extension 220 sorts the timestamps in the list of times based on the elapsed time until the next event after the save occurred. For example, a timestamp corresponding to a save event for which the document 215 was also closed and then not revised for another two days would be chosen before a timestamp corresponding to a save event where the user immediately began working again. Once the timestamps corresponding to save events are sorted according to absolute time until the next recorded event, a threshold number of timestamps are selected. If there are less than or equal to a threshold number of timestamps associated with save events, then the hierarchical clustering algorithm results in every timestamp associated with a save event to be selected as a delimiter for generating the one or more clusters of events. In alternative embodiments, a different type of event other than a save event may be used to select the subset of times for use as delimiters. For example, the hierarchical clustering algorithm may select the subset of times based on data objects related to adding a layer to document 215, a particular tool of application 210, or when data is imported into the application 210 and other like heuristics.

In another embodiment, document workflow application extension 220 generates the list of times to pass to the next step of the hierarchical clustering algorithm by adding each timestamp included in a data object in event data 221 to the list of times. Document workflow application extension 220 then sorts the list of input times based on the absolute time between a time ($t_i$) in the input list and the next subsequent time ($t_{i+1}$) in the input list. For example, time $t_i$ would be sorted higher than time $t_j$ if and only if the difference between $t_{i+1}$ and $t_i$ is greater than the difference between $t_{j+1}$ and $t_j$. The hierarchical clustering algorithm then selects up to a threshold number of timestamps from the top of the sorted list, which corresponds to the timestamps associated with an event corresponding to the largest elapsed time until the next event generated by application 210.

In yet another embodiment, document workflow application extension 220 first attempts to generate the list of times based on each data object related to a save event. If the list of times includes greater than a threshold number of timestamps, then document workflow application extension 220 passes the list of times associated with save events to the next step of the hierarchical clustering algorithm. However, if the list of times does not include greater than a threshold number of timestamps, then document workflow application extension 220 will re-generate the list of times by adding each timestamp included in a data object in event data 221, regardless of whether the data object is related to a save event, to the list of times. Document workflow application extension 220 then passes the list of times to the next step of the hierarchical clustering algorithm.

The one or more delimiter timestamps that result from processing the list of times via the hierarchical clustering algorithm may be used by document workflow application extension 220 to generate one or more graphical representations 610 for display in the document workflow window 320. Each of the one or more delimiter timestamps marks a demarcation between the events that are represented by one graphical representation 610 and the events represented by another graphical representation 610. Document workflow application extension 220 then generates a graphical representation 610 associated with all data objects in event data 221 that are associated with a timestamp between two delimiter timestamps. For example, if the hierarchical clustering algorithm returns two timestamps as delimiter timestamps, the first delimiter timestamp having a value of 10 minutes and the second delimiter timestamp having a value of 25 minutes, then document workflow application extension 220 may generate graphical representations 610 corresponding to three clusters of events: (1) a first cluster of events that includes all events from the beginning of the document workflow history until the time specified by the first delimiter timestamp; (2) a second cluster of events that includes all events from the time specified by the first delimiter timestamp until the time specified by the second delimiter timestamp; and (3) a third cluster of events that includes all events from the time specified by the second delimiter timestamp until the end of the document workflow history.

In one embodiment, each graphical representation 610 includes a first thumbnail image 611, a second thumbnail image 612, a time indicator 613, a timeline 614, one or more tool icons 615, and additional state information 616 related to document 215. As described above, each graphical representation 610 corresponds to a portion of the document workflow history (i.e., a subset of data objects stored in event data 221 for document 215). Once document workflow application extension 220 has determined a cluster of events from which to generate a graphical representation 610, document workflow application extension 220 may search through each of the data objects corresponding to the cluster of events to determine the earliest event and the latest event based on the times reflected in the timestamps associated with the data objects.

The first thumbnail image 611 may be generated based on a captured screenshot in image data 222 corresponding to the earliest event in the cluster of events associated with the graphical representation 610. Similarly, the second thumbnail image 612 may be generated based on a captured screenshot in image data 222 corresponding to the latest event in the cluster of events associated with the graphical representation 610. In alternative embodiments, the thumbnail images 611, 612 may be generated by capturing a particular frame of video data 223 at a point in time in the video associated with the event corresponding to the event associated with the thumbnail image. In yet other embodiments, clicking on a thumbnail image 611, 612 may interactively change the display of the image in graphical representation 610. For example, clicking on a thumbnail image 611, 612 may toggle between a zoomed in view and a zoomed out view of the document 215 associated with an event in the cluster of events. In another scenario, clicking on a thumbnail image 611, 612 may toggle between a front view and a back view of a 3D model. In yet another scenario, clicking on a thumbnail image 611, 612 may provide a user with full navigational controls to manually zoom, pan, or rotate a view of document 215.

The time indicator 613 may correspond to the difference between the time reflected by a timestamp in a data object that corresponds to the latest event and the time reflected by a timestamp in a data object that corresponds to the earliest event. Timeline 614 may indicate the relative portion of the document workflow history associated with graphical representation 610. The marker included in timeline 614 may be sized according to the percentage of the document workflow history associated with graphical representation 610 and positioned at a location in timeline 614 relative to when, in the lifetime of document 215, the events associated with graphical representation 610 were generated. Tool icons 615 may indicate, graphically, one or more tools in application 210 corresponding to the events associated with graphical representation 610. In one embodiment, graphical representation 610 may display the most frequently used tools corresponding to the events associated with graphical representation 610. In another embodiment, graphical representation 610 may display a threshold number of tools. Graphical representation 610 may also display addition state information 616 related to each of the earliest and latest events. For example, as shown in FIG. 6A, the graphical representations 610 may include information about the number of active layers of document 215 during the earliest event and during the latest event in the cluster of events associated with graphical representation 610. It will be appreciated that such state information 616 may be any type of information related to the state of document 215 that may be stored in event data 221 or that such state information 616 may not be included in a graphical representations 610.

In one embodiment, document workflow window 320 may display up to a maximum threshold number of graphical representations 610 corresponding to different clusters of events in the document workflow history. Document workflow histories and, consequently, the number of data objects in event data 221 may grow quite large for complex documents. It will be appreciated that the number of events recorded when creating an image in an image editing application may correspond to hundreds or thousands of events. Thus, document workflow window 320 may include user interface elements for navigation such as expand element 431 and contract element 432. These navigation user interface elements 431 and 432 cause document workflow application extension 220 to generate new graphical representations 610 for display in document workflow window 320.

When a user clicks on the expand element 431 associated with a graphical representation 610, document workflow application extension 220 will re-run the hierarchical clustering algorithm on the subset of data objects associated with the graphical representation 610. Document workflow application extension 220 will then generate one or more new graphical representations 610 for display in document workflow window 320 based on one or more new delimiter timestamps selected from the subset of data objects. Each graphical representation 610 associated with two or more events may be expanded using an expand element 631. In this manner, a user may navigate down through a hierarchy of graphical representations 610 until a graphical representation 610 represents a single event in the document workflow history. Similarly, when a user clicks on the contract element 632, document workflow application extension 220 will re-run the hierarchical clustering algorithm on a larger subset of events than is currently associated with each of the graphical representations 610 displayed in document workflow window 320. Put another way, all of the data objects associated with each of the one or more graphical representations 610 currently displayed in document workflow window 320 will be combined into a single cluster of event for generation of one of the one or more new graphical representations to be displayed in document workflow window 320.

Document workflow window 320 also includes user interface elements 620. The user interface elements 620 may include a data probe element 621, a user interface probe element 622, a selection probe element 623, a refresh element 624, a close video element 625, and a calendar view element 626. A user may use the data probe element 621, the user interface probe element 622, or the selection probe element 623 to select a subset of data objects in event data 221 to process via the hierarchical clustering algorithm in order to generate new graphical representations 610 in document workflow window 320. The functionality of the data probe 700, the user interface probe 800 and the selection probe 900 is described below in connection with FIGS. 7, 8 and 9, respectively.

A user may select the refresh element 624 to cause the graphical representations 610 in the document workflow window 320 to be re-generated based on any current selections of filter criteria. In one embodiment, a user may make changes in selections or use filters, discussed below, that effect the subset of data objects associated with the graphical representations 610 in document workflow window 320. Selecting the refresh element 624 will cause document workflow application extension 220 to re-generate the graphical representations 610 based on any new criteria or filters selected by a user. The close video element 625 may be used to close the video playback window 340 so that the user may edit document 215 in host application window 310. The calendar view element 626 may cause document workflow application extension 220 to display the calendar view 1100, described below in connection with FIG. 11.

As shown in FIG. 6B, the document workflow window 320 may include a tab that enables a user to select one or more filter criteria to apply to the data objects in event data 221 for generating graphical representations 610. Document workflow histories may become quite large for some documents and, therefore, a user may use filters to manage the types of events that are displayed via the graphical representations 610. The types of filters may include time filters 650, layer filters 652, user filters 653 and tool and workflow filters 654 among other like types of filters.

Time filters 651 enable a user to filter the events that are associated with the graphical representations 610. In one embodiment, document workflow application extension 220 enables a user to specify a certain timeframe in the document workflow history from which the one or more graphical representations 610 are generated. For example, by selecting the "Filter Time" filter in time filters 651, the graphical representations 610 are generated based on data objects that have a timestamp between any two times specified by a user. In one embodiment, a user may specify times to use in a time filter using two zoom handles in the timeline window 330, described below. In another embodiment, a user may specify times by entering times into a dialog box or any other technically feasible manner. Time filters 651 may also include an "Undo Events" filter to remove any data objects associated with events that have been reversed by a subsequent undo action. The time filters 651 effect the subset of data objects processed by the hierarchical clustering algorithm and, consequently, the generation of graphical representations 610. However, in one embodiment, the time filters 651 do not affect the playback of video data 223 in video playback window 340 and any filtered events that are not associated with the graphical representations 610 in the document workflow window 320 may still be viewed by a user in the video playback window 340.

Layer filters 652 are filters that may be implemented with image editing applications or any other types of applications that include multiple layers. Layers enable a user to create graphic objects on a hierarchy of transparent canvases that merge to form a single digital image. Pixels included in a top layer are fully visible in the resulting digital image, pixels included in the second layer are visible if not occluded by the pixels in the top layer, pixels included in the third layer are visible if not occluded by the pixels in the top layer or pixels included in the second layer, etc. Layers may be used to create masks for performing operations on pixel data included on other layers in the image. Layers may be deleted, reordered, made partially transparent, or merged with one or more other layers. Layer filters 652 enable a user to select events associated with specific layers of the digital image in order to generate the one or more graphical representations 610.

A "Deleted Layers" filter in layer filters 652 enables a user to filter out events that are associated with any deleted layers. Consequently, the graphical representations 610 exclude any data objects in event data 221 that are associated with layers that have been deleted in document 215. An "Invisible Layers" filter in layer filters 652 may filter out data objects that are not visible because either the user has set a layer to be hidden or the user has set the transparency of a layer to fully transparent. An "Occluded Layers" filter in layer filters 652 may filter out data objects that are associated with any layers that are fully occluded by other layers. If a user selects this filter, document workflow application extension 220 may determine whether any pixels on an associated layer are visible in the resulting digital image. If no pixels are visible, then that layer is considered fully occluded and any data objects associated with that layer are not included in the subset of data objects processed by the hierarchical clustering algorithm to generate the graphical representations 610. In one embodiment, a user may be able to select a specific layer using one or more user interface elements within application 210. Document workflow application extension 220 may then be configured to filter data objects associated with the selected layer in order to generate graphical representations 610 that reflect the events associated with that layer.

User filters 653 are filters that enable a user to generate graphical representations 610 that reflect data objects generated by one or more users of application 210. As shown, document workflow window 320 may enable a user to select one or more users (if document 215 is associated with more than one user) with which to filter the subset of data objects in event data 221 that are processed by the hierarchical clustering algorithm to generate graphical representations 610.

Tool and workflow filters 654 are filters that are associated with a feature of application 210. Such features may includes tools, layers, or applied effects as well as other features included in application 210 that may be associated with a data object in event data 221. In one embodiment, document workflow window 320 enables a user to select a single feature (e.g., a line tool), an entire category (e.g., drawing tools), or a set of features across multiple categories (e.g., all drawing tools and applied effects, such as a Gaussian blur effect). In another embodiment, document workflow application extension 220 may include preset groups of features or allow users to create preset groups of features such as a "Creations" group that selects all features that may add content to document 215 or a "Features not Used Before" group that selects all features that the current user has not used before. In yet another embodiment, document workflow application extension may enable a user to select one or more features in the tool and workflow filters 654.

In one embodiment, all of the filters described above may be used in combination with any of the probing tools, described below. Once a user selects which filters to apply, the user may use a probing tool, such as data probe 710 or the user interface probe 810, to generate one or more graphical representations 610 in document workflow window 320.

Figure 7A:
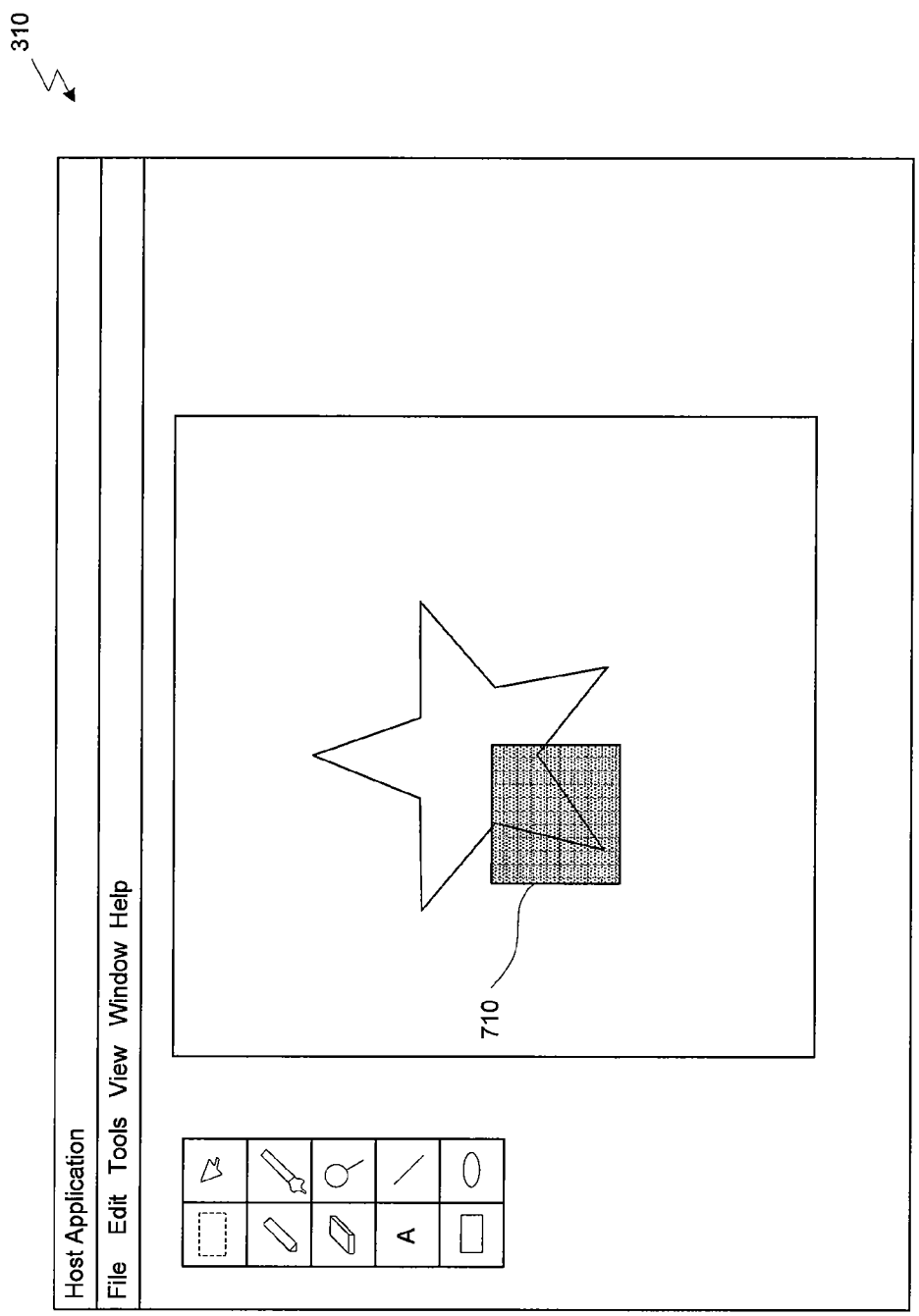
FIGS. 7A-7B illustrate the data probe, according to one example embodiment of the present invention.
Figure 7B:
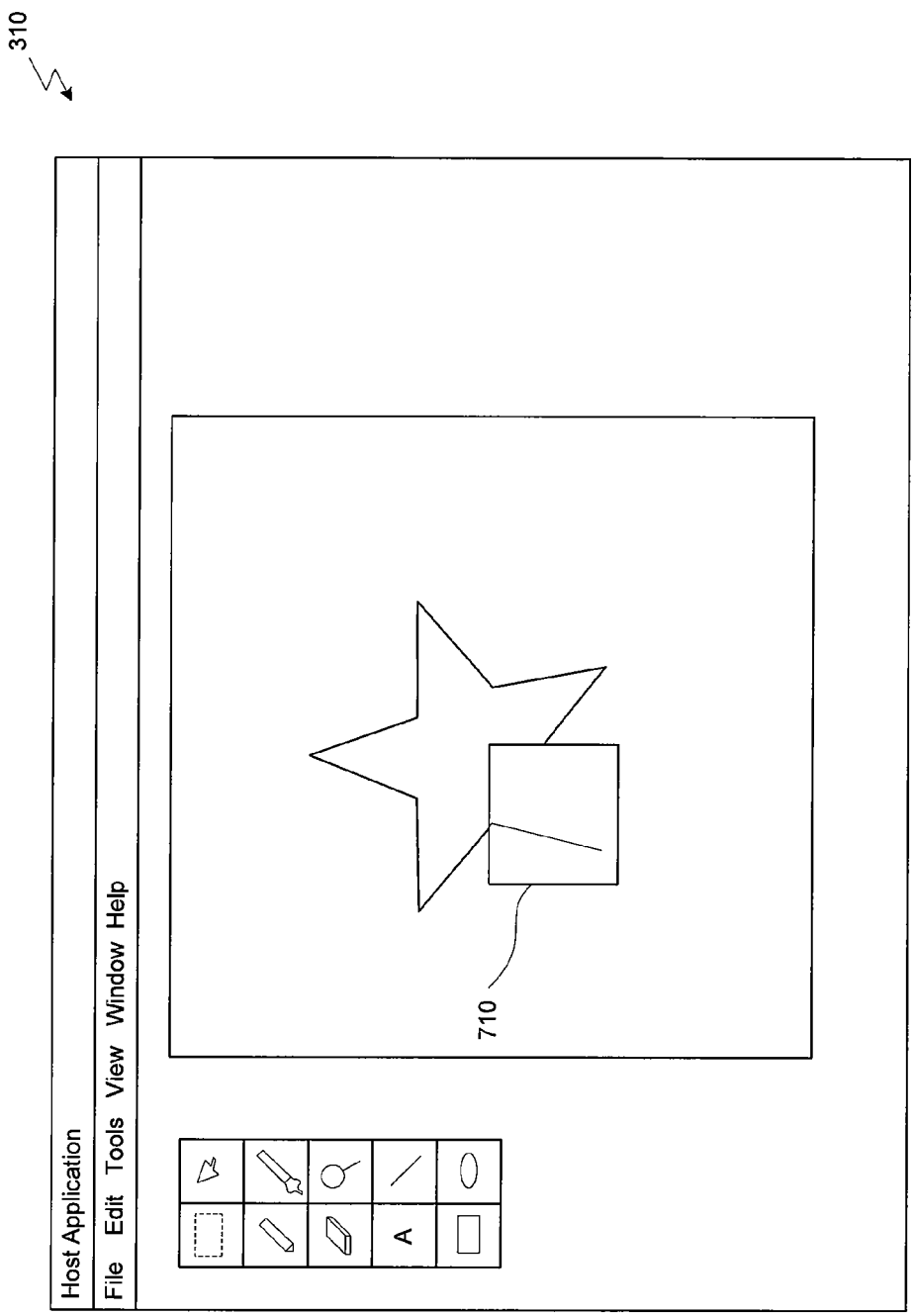

FIGS. 7A-7B illustrate the data probe 710, according to one example embodiment of the present invention. As shown in FIG. 7A, the data probe 710 may be used to specify a region within document 215 for generation of one or more graphical representations 610 displayed in document workflow window 320. In one embodiment, the size of the data probe 710 may be adjusted using a scroll wheel of a mouse device 109 or other input means. Similarly, the position of the data probe 710 may be controlled by the position of the mouse cursor. In response to receiving a selection by the data probe 710, such as in response to a mouse click, document workflow application extension 220 may generate one or more new graphical representations 610 based on a subset of data objects in event data 221 that are associated with the one or more cells of document 215 that overlap with the data probe 710. For example, when a user clicks the mouse 109, the current aperture (i.e., the square that is overlaid on the host application window 310) of the data probe 710 is compared to each of the cells of document 215. For each cell 411-430 that overlaps with the aperture of the data probe 710, document workflow application extension 220 may access the corresponding slot 461-680 in array 460 to determine which data objects in event data 221 are associated with the regions of document 215 that overlap with the data probe 710. The document workflow application extension 220 may then generate a list of timestamps corresponding to each data object associated with the overlapping cells and that also pass any currently selected filter criteria to pass to the hierarchical clustering algorithm to generate time delimiters for use in generating one or more graphical representations 610 that correspond to only that portion of document 215 that is associated with the aperture of the data probe 710.

In another embodiment, data probe 710 may be used as a lens into the document's workflow history. Document workflow application extension 220 may access the plurality of data objects in event data 221 and determine a subset of data objects that are associated with regions of document 215 that overlap with the aperture of the data probe 710. A user may then navigate through the document workflow history by going forward or backward through the events corresponding to the subset of data objects. The aperture of the data probe 710 may display cropped versions of the captured screenshots in image data 222 associated with each data object in the subset of data objects. Thus, inside the aperture of data probe 710, the user may visualize a previous state of document 215 at a point in time corresponding to one of the events associated with the subset of data objects. Simultaneously, outside the aperture of data probe 710, the user may still visualize a current state of document 215, which may provide context to the final result generated by the workflow history. As shown in FIG. 7B, document 215 includes a star drawn using a line tool. The data probe 710 may be used to visualize document 215 at a previous state corresponding to one of the data objects in the subset of data objects. Outside of the aperture of data probe 710, the current state of document 215 remains visible. Moving the aperture of the data probe 710 around the document frame 511 will reveal the state of document 215 corresponding to one of the data objects in a subset of data objects generated based on the location of the data probe 710.

Figure 8:
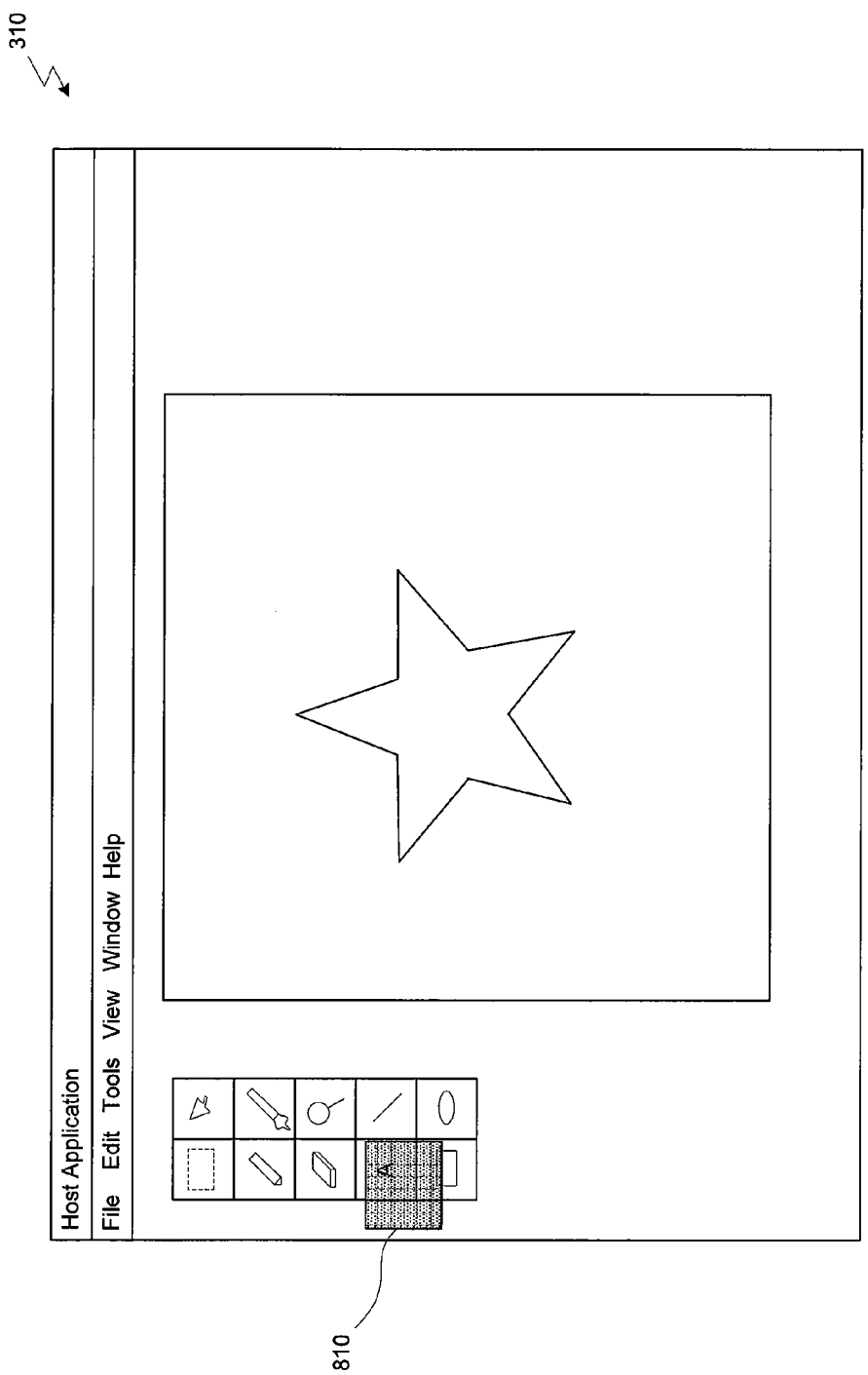
FIG. 8 illustrates the user interface probe, according to one example embodiment of the present invention.

FIG. 8 illustrates the user interface probe 810, according to one example embodiment of the present invention. As shown in FIG. 8, the user interface probe 810 is similar to the data probe 710 described above except that the aperture of the user interface probe 810 is used to generate graphical representations 610 based on data objects in event data 221 that are associated with one or more user interface elements of the host application window 310. In one embodiment, the user interface probe 810 may be a different color than the data probe 710 to distinguish between the two tools. The size and position of the aperture of the user interface probe 810 may be adjusted in a similar manner as the data probe 710, described above.

The user interface probe 810 may be used to select a subset of data objects that are associated with tool icons, floating palettes, setting icons, menu items, and dialog boxes in the host application window 310. In response to a selection with the user interface probe 810, document workflow application extension 220 may generate one or more graphical representations 610 in document workflow window 320 based on a subset of data objects in event data 221 that are associated with any of the user interface elements in host application window 310 that overlap with the current aperture of the user interface probe 810. In another embodiment, selecting a menu item of host application window 310 while holding a hotkey, such as F2, is equivalent to selecting the menu item with the user interface probe 810.

For example, as shown in FIG. 8, the aperture of the user interface probe 810 overlaps with both a text tool and a rectangle tool in toolbar 512 of the host application window 310. In response to such a selection with the user interface probe 810, document workflow application extension 220 traverses through each of the data objects in event data 221 and determines whether the data object is associated with an event related to either the text tool or the rectangle tool. If the data object is associated with a related event, then document workflow application extension 220 adds the timestamp included in that data object to a list of times to pass to the hierarchical clustering algorithm. If the data object is not associated with a related event, then document workflow application extension 220 moves to the next data object. Document workflow application extension 220 then generates one or more graphical representations 610 in document workflow window 320 based on a subset of events corresponding to times returned from the hierarchical clustering algorithm.

Figure 9:
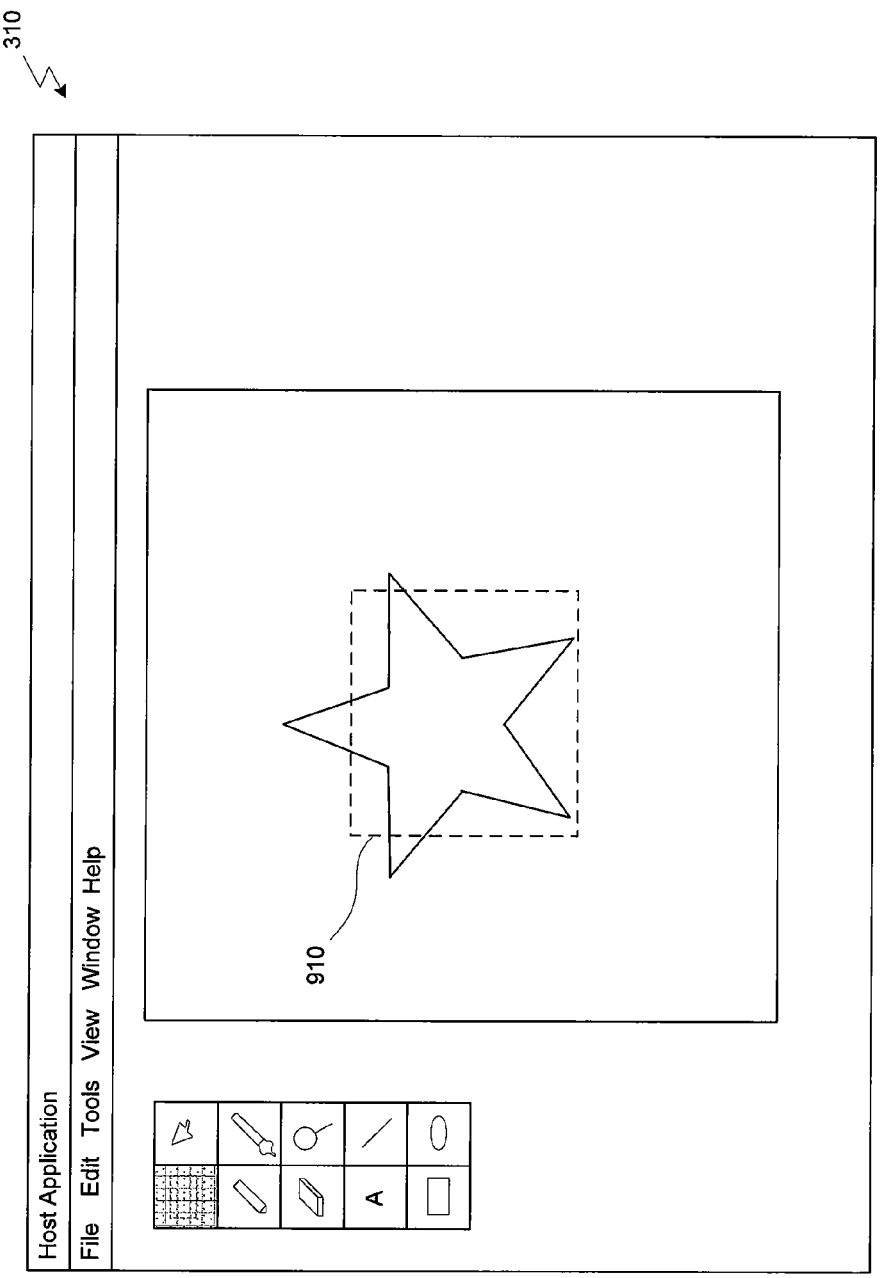
FIG. 9 illustrates the selection probe, according to one example embodiment of the present invention.

FIG. 9 illustrates the selection probe 910, according to one example embodiment of the present invention. As shown in FIG. 9, a user may create a selection marquee based on native selection tools included in application 210. For example, the user may use a rectangle selection tool or a freeform selection tool of application 210. When a user selects the selection probe element 623 in document workflow window 320, document workflow application extension 220 will generate new graphical representations 610 based on the current selection in document 215. In there is no current selection when a user selects the selection probe element 623, then the user may user a native selection tool in application 210 to select a portion of document 215. Once the selection is made, document workflow application extension 220 may generate the new graphical representations 610 in a similar manner to that describe in connection with data probe 710 for any cells of document 215 that overlap with the current selection area.

Figure 10:
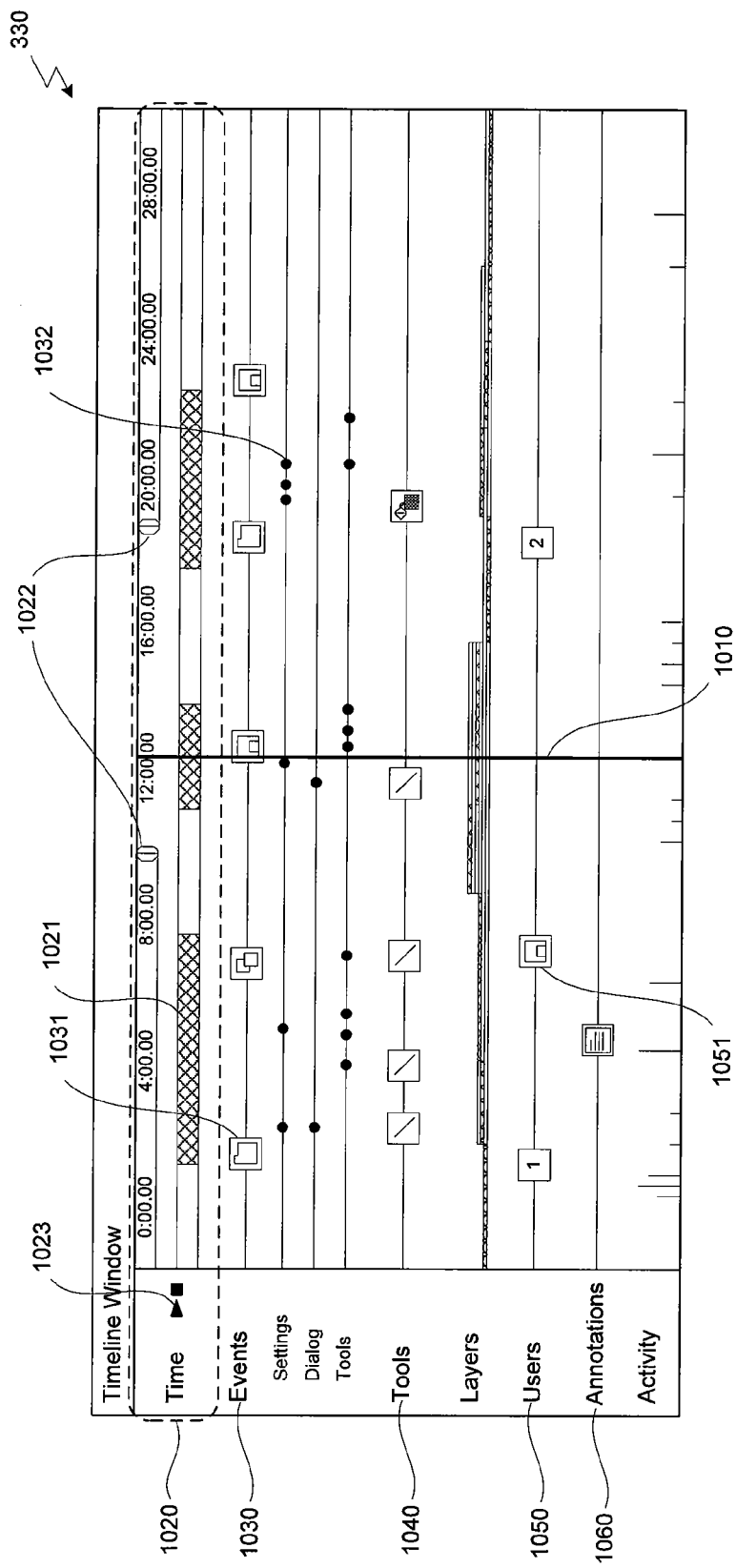
FIG. 10 illustrates a timeline window, according to one example embodiment of the present invention.

FIG. 10 illustrates a timeline window 330, according to one example embodiment of the present invention. The timeline window 330 may be used to control playback of one or more frames of digital video in video data 223 in video playback window 340. When a user switches focus to the timeline window 330, document workflow application extension 220 may cause video playback window 340 to be overlaid over host application window 310. Video data 223 associated with document 215 may then be played in the video playback window 340 to display the workflow history of document 215. Such playback of video data 223 associated with document 215 enables a user to visualize previous operations or changes associated with the creation of document 215. A timeline marker 1010 indicates the current position of the video in the video playback window 340 and may be dragged to scrub the video forward or backward in video playback window 340. In one embodiment, timeline window 330 may also include playback controls 1023 such as play, pause, stop, rewind, and fast forward that will cause video playback to begin at a frame of video data 223 that corresponds to the current position of the timeline marker 1010.

As shown in FIG. 10, timeline window 330 may include timing information 1020, an event track 1030, a tools track 1040, a users track 1050, an annotation track 1060, and one or more other tracks (such as a colors track or layers track in an image editing application) related to application 210. The timing track 1020 includes video timing information that may be in an absolute time, such as a date and time of a system clock associated with a particular frame of video data 223, or an elapsed time, such as a relative time in tenths of seconds that document 215 was open in application 210. The timing track 1020 may include one or more markers 1021 that correspond to a timeframe in the video data 223 associated with a graphical representation 610 currently displayed in the document workflow window 320.

A user may zoom in or out of the timeline window 330 to display only a portion of the total timeline associated with the document workflow history. In one embodiment, the timeline track 1020 includes zoom handles 1022 that allow a user to zoom into a portion of the timeline. As shown, each of the tracks in the timeline window 330 (i.e., the events track 1030, the tools track 1040, etc.) will be repopulated to only show the associated marker objects that correspond to a data object in event data 221 with a timestamp that reflects a time in between the two zoom handles 1022. In another embodiment, when a user clicks on a graphical representation 610 in the document workflow window 320, the timeline may be automatically zoomed into that portion of the timeline window 330 corresponding to the subset of data objects associated with the graphical representation 610.

The event track 1030 includes one or more marker objects 1031 that each correspond to a different data object in event data 221. Each marker object 1031 is located at a position in the event track 1030 that corresponds to the timestamp included in the associated data object in event data 221. In one embodiment, a marker object 1031 may be an icon related to the particular event type associated with that marker object 1031. In another embodiment, the icon may be of variable width to prevent overlap of multiple marker objects on the event track 1030. In yet another embodiment, the icon may have a variable width that corresponds to the duration of time represented by the marker object 1031. For example, if a dialog box was open for 35 seconds, then the associated marker object 1031 would have a width representing 35 seconds of time on the timeline.

The event track 1030 may be expanded to include one or more subtracks that display information about the particular event associated with a marker object 1031 in the event track 1030. For example, as shown in FIG. 10, the subtracks may include information about settings, dialog boxes, user actions, or tools selected in application 210 that are related to the marker object 1031. Additional marker objects 1032s may be placed on the subtracks to indicate that the event associated with marker object 1031 includes information related to one of the subtrack categories.

In one embodiment, placing a mouse cursor over a marker object 1031 in the events track 1030 or one of the additional marker objects 1032 in the subtrack may cause document workflow application extension 220 to display a tooltip that provides a user with additional information about that particular event. For example, hovering the mouse cursor over a marker object 1032 on the settings subtrack may display information about the particular setting that was changed and the value that the setting was changed to. Tooltips may be displayed for an action marker, a tool marker, a setting marker, a save point, a user marker, or a color marker among other types of marker objects 1031. In one embodiment, hovering the mouse cursor over a marker object 1032 on the dialog subtrack may display the actual dialog box in application 210 that is associated with the marker object 1032 and any changes to the dialog box may be highlighted by using a phosphor or other special effect to draw the user's focus to the particular setting in the dialog box that was adjusted by the event. In another embodiment, a user may be able to cycle through a plurality of images of the dialog box, where each image represents a different state of the dialog box, from when the dialog box was first opened to when the dialog box was closed. A key on the keyboard 108 or a button or wheel on the mouse 109 may be used to cycle through the plurality of images.

In yet another embodiment, marker objects 1031 may be associated with other related marker objects 1031 on one or more tracks in timeline window 330. When a user hovers the mouse cursor over a tool marker, one or more associated marker objects 1031 may be highlighted to show that there is an association between the two marker objects 1031. For example, a marker object 1032 on the tools subtrack may be associated with a separate marker object 1032 on the settings subtrack. The marker object 1032 on the settings subtrack may correspond to a change in a value of a setting associated with the tool that corresponds to the marker object 1032 on the tools subtrack.

The tools track 1040 (unlike the tools subtrack associated with the event tack 1030) may indicate which tool of application 210 was selected at any point in time in the document workflow history. The tools track 1040 indicates an application state rather than an explicit event in the document workflow history (i.e., a marker object in the tool track 1040 indicates that a tool in application 210 was active during a period of time, but not necessarily that the tool was used). The user track 1050 indicates a user that was editing document 215 at a given point in the document workflow history. For documents with a single author, there may only be one marker on the user track 1050. However, many documents may have multiple contributors, and the user track 1050 may display information on the various authors that have opened document 215. In addition, the user track 1050 may include save markers 1051 that indicate a save event where the user saved document 215. In one embodiment, a user may right-click on a save marker 1051 and restore a previous version of the document 215 associated with the save event corresponding to the save marker 1051. The annotation track 1060 may include one or more marker objects that correspond to any annotations which have been added to video data 223. Annotation markers may be configured to identify the user that added the annotation to video data 223 as well as the text or graphic that was added by the annotation event.

As also shown in FIG. 10, one or more other tracks may be included in timeline window 330. For example, the colors track may display the selected color or selected colors at a given point in the document revision history. The layers track may display the active layers of document 215. The activity track may display the relative amount of activity, such as by measuring the number or frequency of mouse clicks, at a given point in time in the document workflow history.

In one embodiment, a user may be able to select a portion of the document revision history in the timeline window 330, such as by dragging the timeline marker 1010 or dragging the zoom handles 1022, in order to select a subset of events within the document revision history. Then, the user may right-click on the timeline window 330 in the selected portion of the timeline to apply the selected portion of the document revision history to a new document 215. In alternative embodiments, a user may interact with other features of the timeline window 330 such as by right-clicking a marker object 1031, 1032, etc. and applying the operation corresponding to the marker object to the current document 215. In yet other embodiments, users may be able to drag-and-drop a marker object 1031, 1032, etc. from the timeline window 330 onto a document 215 to apply the corresponding operation to the document 215. For example, a user could drag-and-drop a marker object 1032 associated with a gradient tool from the tools subtrack in the timeline window 330 to apply the associated gradient operation to a document 215. Such features may be applied to the document 215 associated with the currently open document revision history or may be applied to other documents or even applications (e.g., a gradient tool in Paint.net could be applied to a document opened in a Photoshop application). In another embodiment, a portion of a document revision history may be selected in the timeline window 330 and export to share with other users such as through an email attachment or instant message.

Figure 11:
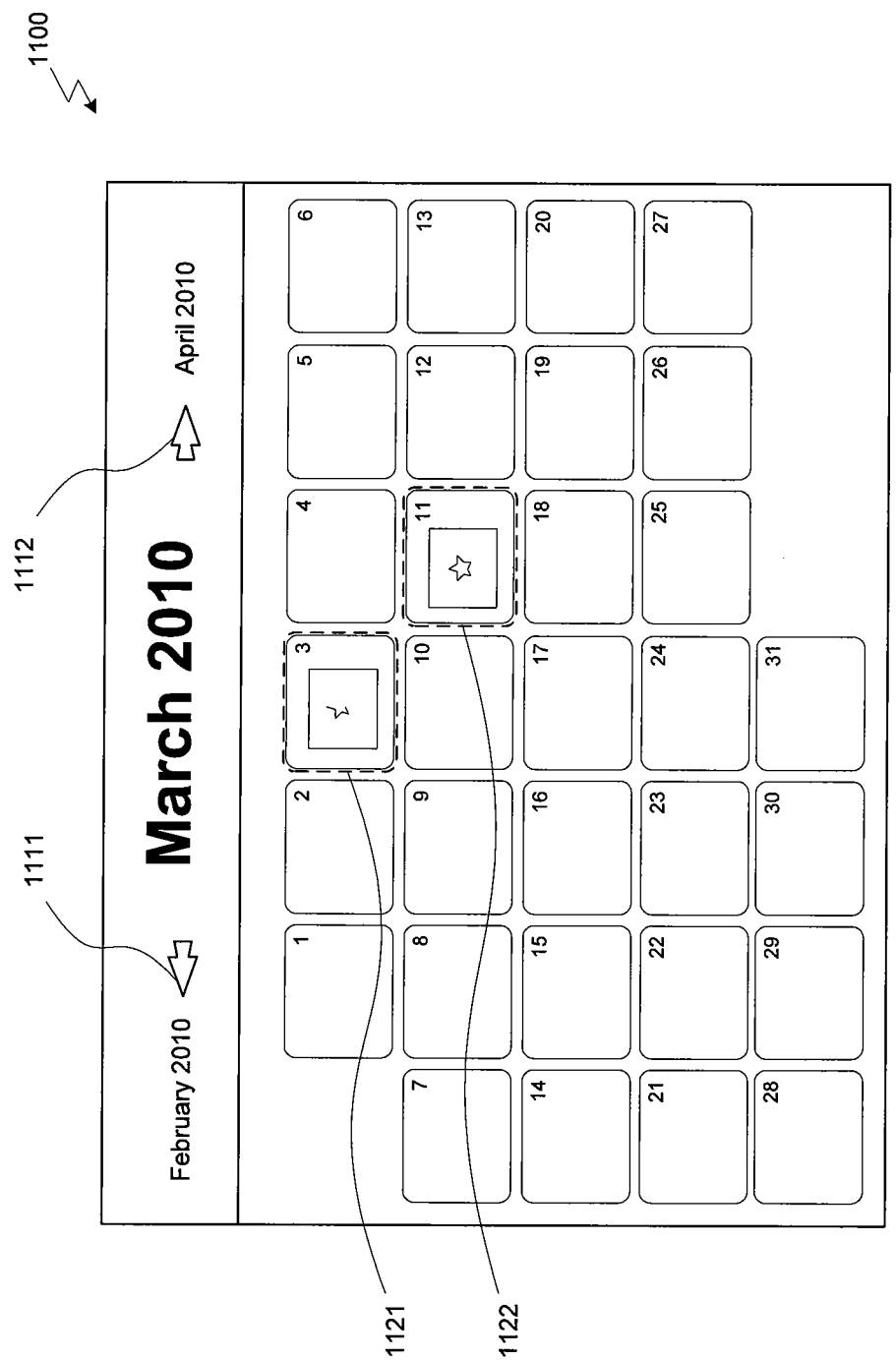
FIG. 11 illustrates a graphical user interface for a calendar view of the document workflow history, according to one example embodiment of the present invention.

FIG. 11 illustrates a graphical user interface for a calendar view 1100 of the document workflow history, according to one example embodiment of the present invention. A user may select the calendar view element 626 in the document workflow window 320 to cause document workflow application extension 220 to display the calendar view 1100 of the document workflow history. The calendar view 1100 enables a user to see the state of a document 215 as it existed on different dates. In one embodiment, the calendar view 1100 may display a calendar for the month associated with the current date. The calendar view 1100 may also include navigation controls 1111 and 1112 to navigate to different months. In other embodiments, the calendar view 1100 may display dates by week, bi-weekly, bi-monthly, or annually in a single view.

An icon associated with the state of document 215 on a given date may be displayed on a date of the calendar view 1100. As shown, a first icon 1121, that represents a first state of document 215 as saved on Mar. 3, 2010, is displayed in the calendar view 1100. A second icon 1122, that represents a second state of document 215 on Mar. 11, 2010, is also displayed in the calendar view 1100. In one embodiment, hovering the mouse cursor over an icon in the calendar view 1100 may cause a tooltip to display information related to the user or users that accessed document 215 on that date. In another embodiment, clicking on an icon in the calendar view 1100 may cause the timeline window 330 to zoom in on a timeframe corresponding to that particular date. In yet another embodiment, clicking on an icon in the calendar view 1100 may cause video playback window 340 to be displayed and video data 223 associated with that particular date to be played in the video playback window 340.

Figure 12A:
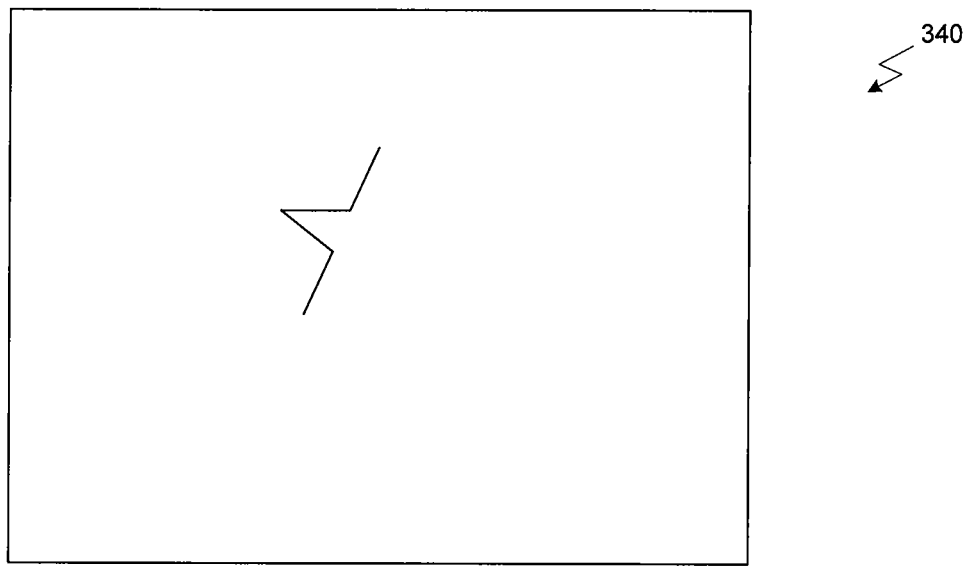
FIGS. 12A-12B illustrate adding annotations to one or more frames of video data, according to one example embodiment of the present invention.
Figure 12B:
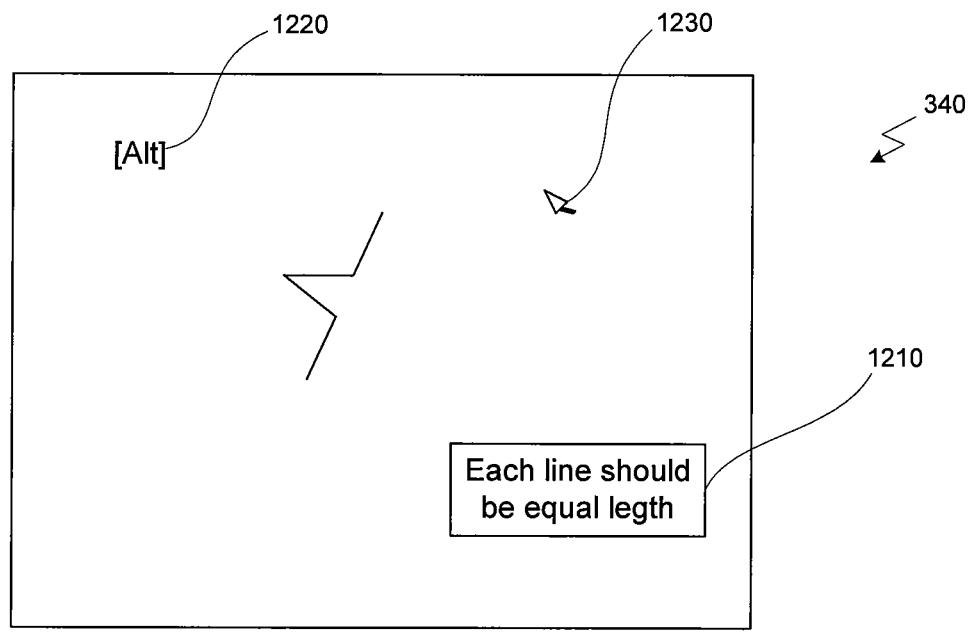

FIGS. 12A-12B illustrate adding annotations 1210 to one or more frames of video data 223, according to one example embodiment of the present invention. Again, document workflow application extension 220 may be configured to record and play back video data 223 in the video playback window 340. The captured video data 223 enables a user to visualize the previous actions and events that culminated in document 215. The rich content that is captured by the document workflow application extension 220 may be utilized as a teaching tool to inform other users how a particular effect or element of document 215 was created. As shown in FIG. 12A, a user may navigate to a particular frame of the video using the timeline marker 1010 in timeline window 330 or the video playback controls 1023. In one embodiment, a user may add an annotation to a frame of video data 223 by pressing a hotkey such as F8 to insert a string of text or graphic that is overlaid on top of the frame of video in video playback window 340. In another embodiment, a user may be able to add audio annotations to a frame or frames of video.

In addition to annotating frames of video data 223, a user may annotate a portion of the document revision history using the timeline window 330 by selecting a portion of the timeline window using the zoom handles 1022 or dragging the timeline marker 1010 with a mouse. For example, the user could select a portion of the timeline and indicate that the selected portion is an area of interest or, alternatively, an area of little interest. A user may also be able to mark a portion of the document revision history as private, thereby disabling other users from being able to view information related to that portion of the document revision history. Such hidden areas of the document revision history may be indicated on the timeline window 330 with annotated comments that indicate that portion of the document revision history has been made private by the author of the document 215.

As shown in FIG. 12B, document workflow application extension 220 may add a graphical overlay to the frame of digital video in video data 223 that includes a string of text entered by a user. The annotation 1210 may help a user understand how an effect was created in document 215. Document workflow application extension 220 may store the annotation text as metadata along with frame of video data 223 and generate the graphical overlay at runtime. In addition, document workflow application extension 220 may also generate a graphical overlay to indicate keystrokes 1220 or any actions or position data 1230 associated with the mouse device 109. In other embodiments, document workflow application extension 220 may modify the pixel data in one or more frames of video data 223 such that the annotation is permanently included in the digital video.

Figure 13:
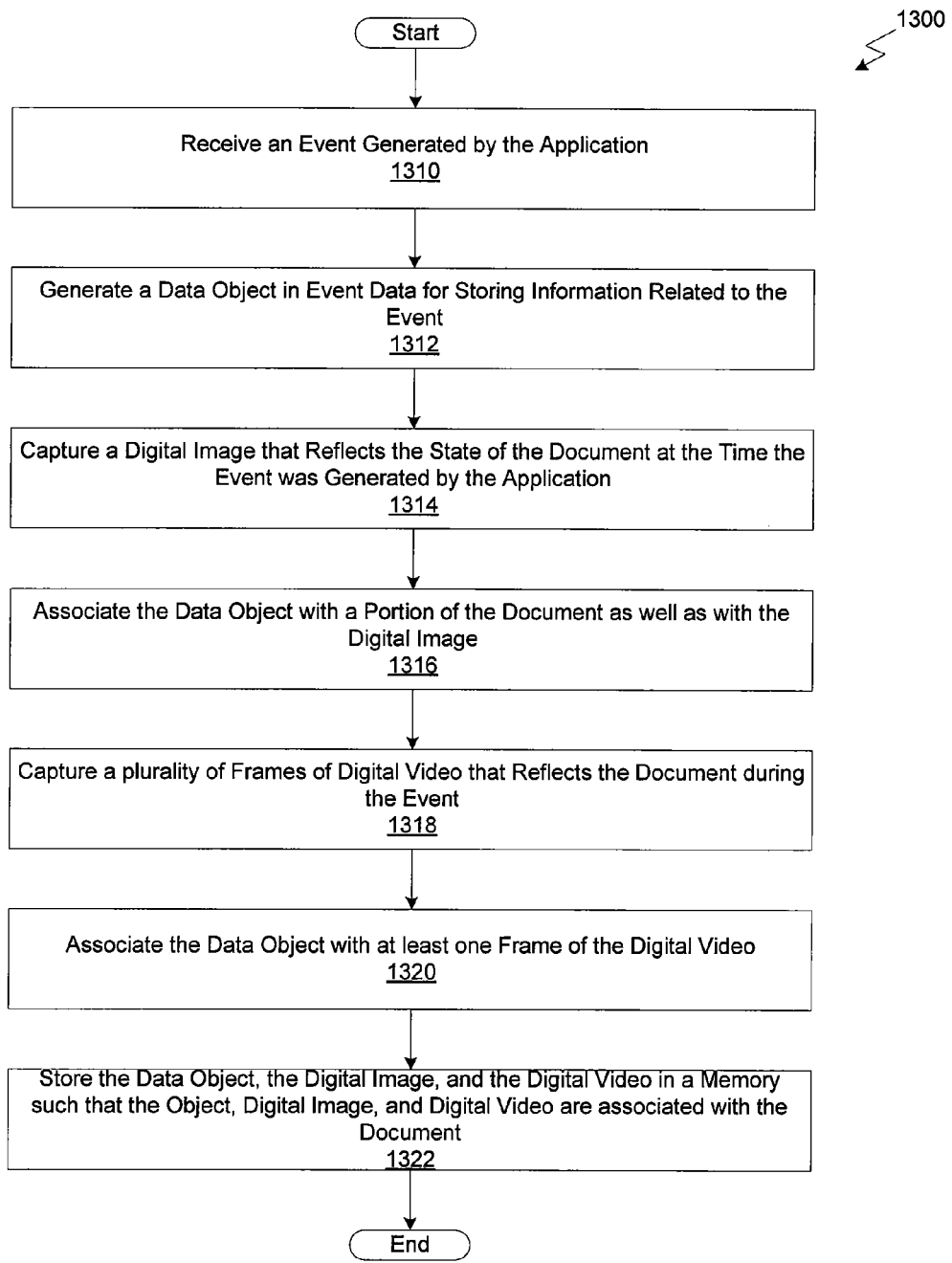
FIG. 13 is a flowchart of method steps for capturing a workflow history of an electronic document, according to one example embodiment of the present invention.

FIG. 13 is a flowchart of method steps 1300 for capturing a workflow history of an electronic document 215, according to one example embodiment of the present invention. Although the method steps are described in conjunction with the systems of FIGS. 1-12, persons skilled in the art will understand that any system configured to perform the method steps, in any order, is within the scope of the inventions.

The method 1300 begins at step 1310, where document workflow application extension 220 receives an event generated by application 210. The event may be generated by application 210 in response to a user command and may result in a modification to document 215. At step 1312, document workflow application extension 220 generates a data object in event data 221 that stores information related to the event. In one embodiment, the data object may include a timestamp and an ID that identifies a feature of application 210. At step 1314, document workflow application extension 220 captures a screenshot (i.e., a digital image) of document 215 that reflects a state of document 215 at a time corresponding to the generation of the event. At step 1316, document workflow application extension 220 associates the data object generated in step 1312 with a portion of document 215 modified by the event as well as the screenshot captured at step 1314. In one embodiment, document 215 is a digital image that is divided into one or more cells that include a block of pixels. Document workflow application extension 220 associates the data object with each cell of pixels in document 215 that was modified as a result of the event. In one embodiment, document workflow application extension 220 also stores a pointer to the captured screenshot in the data object. At step 1318, document workflow application extension 220 captures a plurality of frames of digital video that reflects a state of document 215 at a time corresponding to the generation of the event. In one embodiment, document workflow application extension 220 captures digital video of host application window 310 at 10 frames per second and stores the digital video in video data 223. At step 1320, document workflow application extension 220 associates the data object with at least one frame of the digital video. In one embodiment, document workflow application extension 220 stores a pointer to a first frame of digital video in the data object. At step 1322, document workflow application extension 220 stores the data object, the digital image, and the digital video in system memory 104 or in non-volatile storage such as system disk 114. The data object, the digital image, and the digital video may be associated with document 215 such that document workflow application extension 220 may retrieve the data object, the digital image, and the digital video when a user opens document 215 in application 210.

Figure 14:
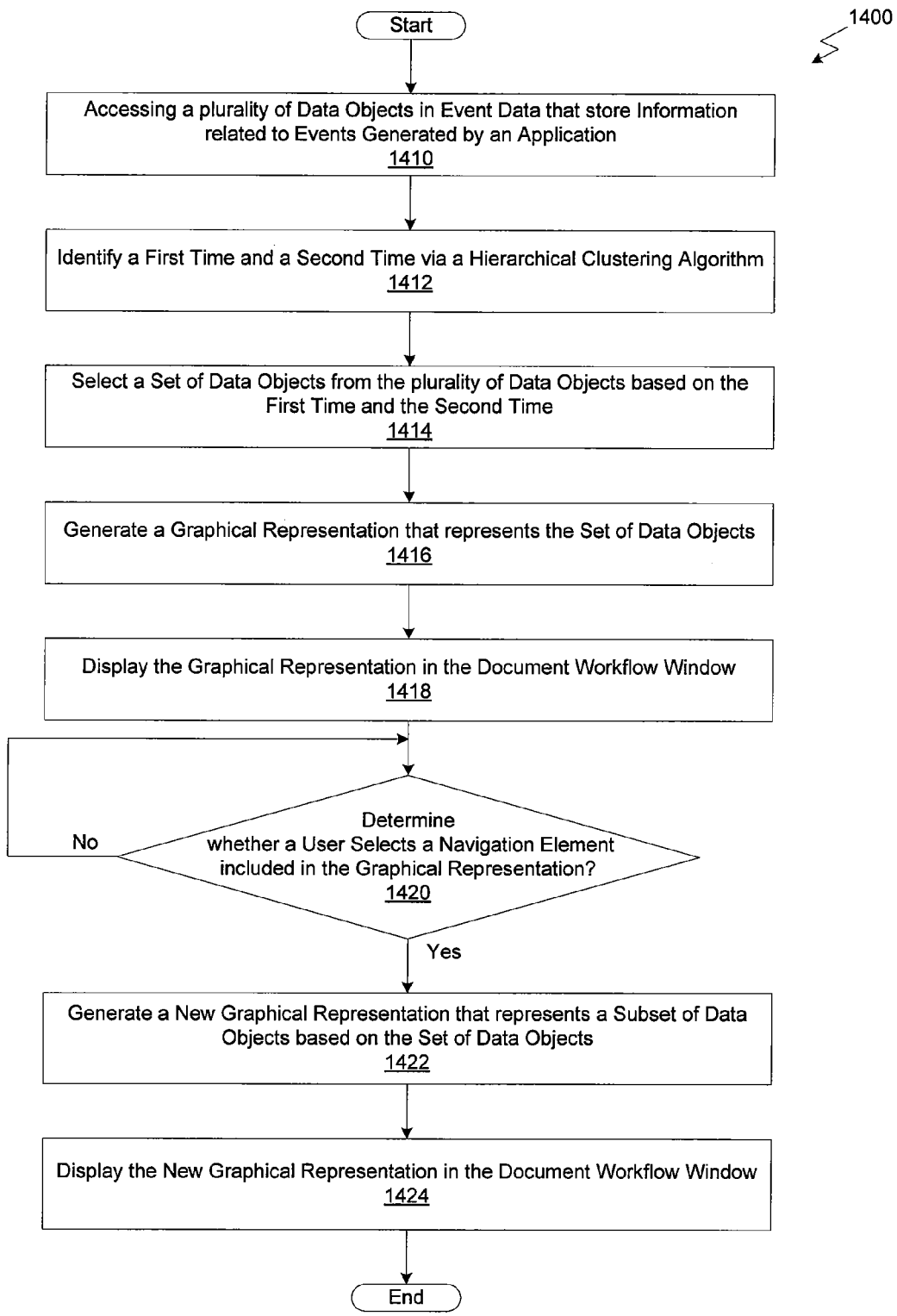
FIG. 14 is a flowchart of method steps for generating and navigating a graphical representation of a workflow history of an electronic document, according to one example embodiment of the present invention.

FIG. 14 is a flowchart of method steps 1400 for generating and navigating a graphical representation of a workflow history of an electronic document, according to one example embodiment of the present invention. Although the method steps are described in conjunction with the systems of FIGS. 1-12, persons skilled in the art will understand that any system configured to perform the method steps, in any order, is within the scope of the inventions.

The method 1400 begins at step 1410, where document workflow application extension 220 accesses a plurality of data objects in event data 221. In one embodiment, each data object in event data 221 stores information related to an event generated by application 210. At step 1412, document workflow application extension 220 identifies a first time and a second time via a hierarchical clustering algorithm. In one embodiment, document workflow application extension 220 analyzes the plurality of data objects via a hierarchical clustering algorithm. The first time and the second time may be identified based on at least one data object related to a save event. In another embodiment, the first time and the second time may be identified based on the largest elapsed time between subsequent events. At step 1414, document workflow application extension 220 selects a set of data objects from the plurality of data objects in event data 221 based on the first time and the second time. In one embodiment, each data object in the set of data objects includes a timestamp that reflects a time that is either equal to the first time, equal to the second time, or falls between the first time and the second time.

At step 1416, document workflow application extension 220 generates a graphical representation that represents the set of data objects. In one embodiment the graphical representation includes a first thumbnail image that reflects a state of document 215 prior to any of the events corresponding to a data object in the set of data objects and a second thumbnail image that reflects a state of document 215 after all of the events corresponding to a data object in the set of data objects. The graphical representation may also include a duration indicator that reflects a difference between the times reflected in the timestamps stored in the first data object and the last data object in the set of data objects. At step 1418, document workflow application extension 220 causes the graphical representation to be displayed in a graphical user interface associated with the document workflow application extension 220. In one embodiment, the graphical representation is displayed in the document workflow window 320 proximate to the host application window 310.

At step 1420, document workflow application extension 220 determines whether a user selects a navigation element associated with the graphical representation 610 in document workflow window 320. If a user has not selected the navigation element, then document workflow application extension 220 waits until the navigation element is selected. If a user selects the navigation element, then method 1400 proceeds to step 1422, where document workflow application extension 220 generates a new graphical representation 610 that represents subset of data objects based on the set of data objects associated with the graphical representation 610. For example, document workflow application extension 220 may generate a new graphical representation 610 in response to a user expanding one of the graphical representations in document workflow window 320. Document workflow application extension 220 may generate a new subset of data objects based on a portion of the set of data objects represented by the graphical representation 610. In this manner, a user may visualize a smaller subset of events within the document workflow history. At step 1424, document workflow application extension 220 causes the new graphical representation 610 to be displayed in the document workflow window 320.

Figure 15:
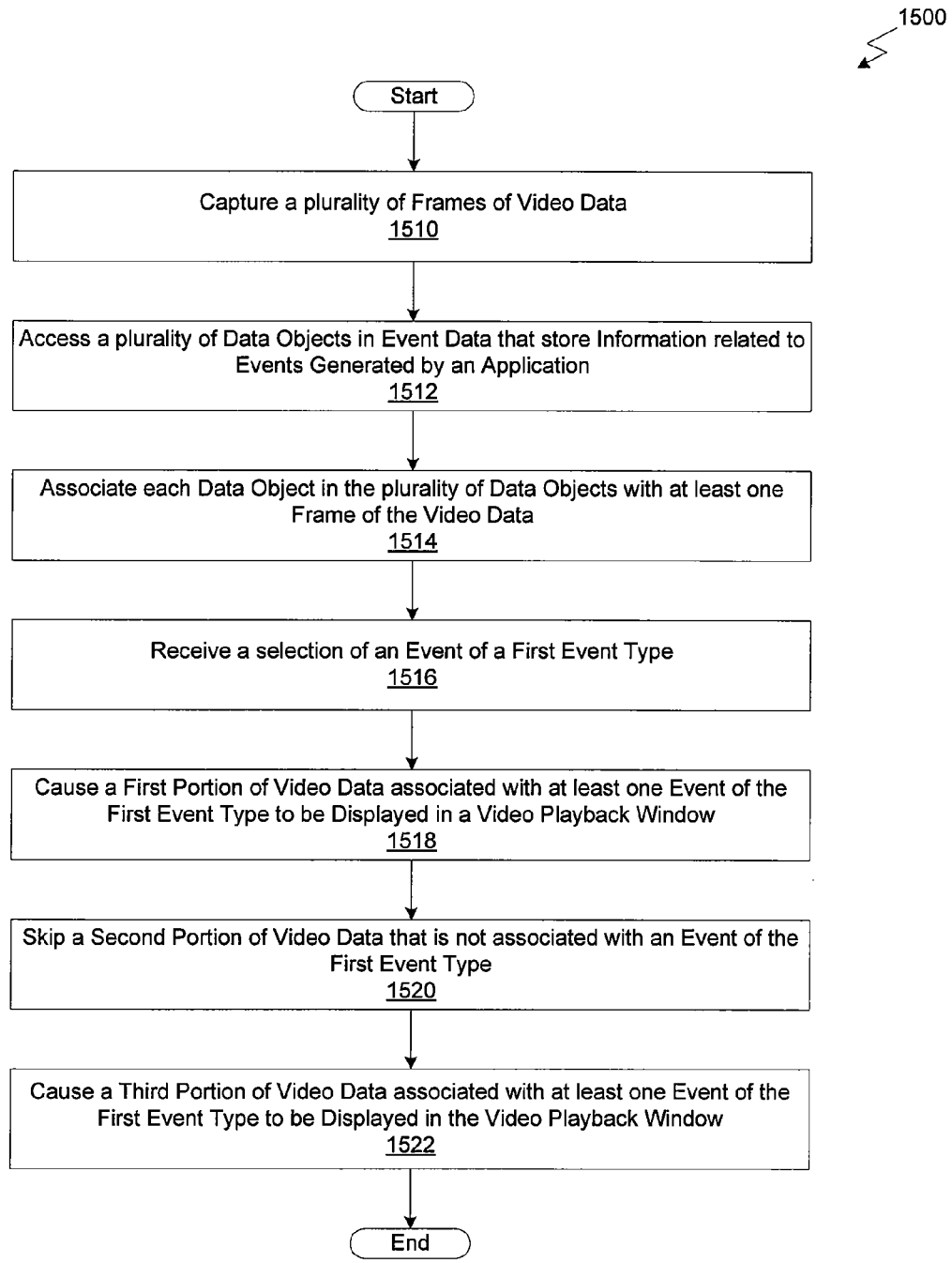
FIG. 15 is a flowchart of method steps for generating and displaying video data representing a workflow history of an electronic document, according to one example embodiment of the present invention.

FIG. 15 is a flowchart of method steps 1500 for generating and displaying video data representing a workflow history of an electronic document, according to one example embodiment of the present invention. Although the method steps are described in conjunction with the systems of FIGS. 1-12, persons skilled in the art will understand that any system configured to perform the method steps, in any order, is within the scope of the inventions.

The method 1500 begins at step 1510, where document workflow application extension 220 captures a plurality of frames of video data 223. In one embodiment, document workflow application extension 220 captures a plurality of frames of digital video at 10 fps, where each frame corresponds to a screenshot of host application window 310. At step 1512, document workflow application extension 220 accesses a plurality of data objects in event data 221. In one embodiment, each data object in event data 221 stores information related to an event generated by application 210. At step 1514, document workflow application extension 220 associates each data object in the plurality of data objects with at least one frame of digital video in video data 223. At step 1516, document workflow application extension 220 receives a selection of an event corresponding to a first event type. In one embodiment, event types may include settings events, tool events, user events, save events, or any other type of event that is related to application 210.

At step 1518, document workflow application extension 220 causes a first portion of video data 223 to be displayed in video playback window 340. At least one frame of the first portion of video data 223 is associated with a data object corresponding to an event of the first event type. At step 1520, document workflow application extension 220 skips a second portion of video data 223. In one embodiment, document workflow application extension 220 is configured to fast forward to a third portion of video data 223. At step 1522, document workflow application extension 220 causes the third portion of video data 223 to be displayed in video playback window 340. At least one frame of the third portion of video data 223 is associated with a data object corresponding to an event of the first event type.

Figure 16:
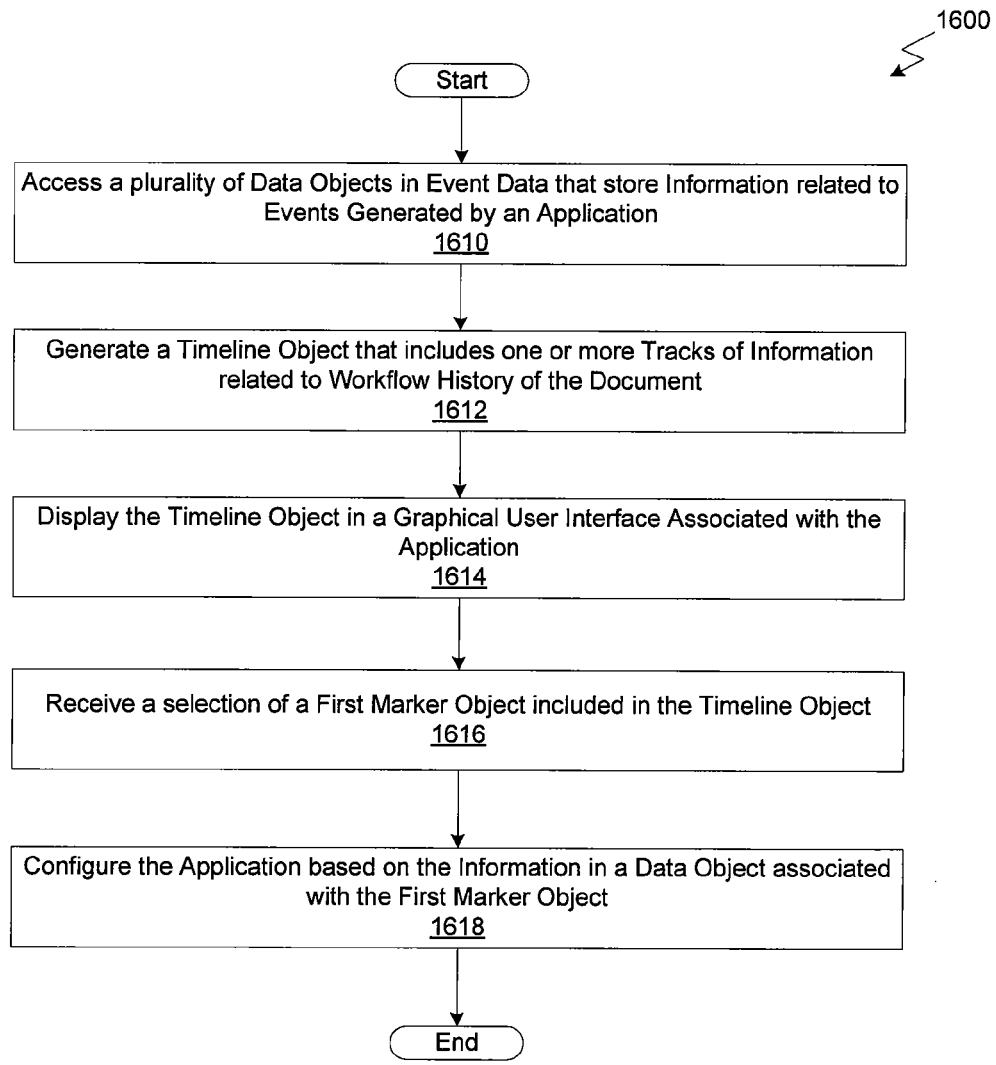
FIG. 16 is a flowchart of method steps for configuring an application based on a workflow history of an electronic document, according to one example embodiment of the present invention.

FIG. 16 is a flowchart of method steps 1600 for configuring an application based on a workflow history of an electronic document, according to one example embodiment of the present invention. Although the method steps are described in conjunction with the systems of FIGS. 1-12, persons skilled in the art will understand that any system configured to perform the method steps, in any order, is within the scope of the inventions.

The method 1600 begins at step 1610, where document workflow application extension 220 accesses a plurality of data objects in event data 221. In one embodiment, each data object in event data 221 stores information related to an event generated by application 210. At step 1612, document workflow application extension 220 generates a timeline object that includes one or more tracks of information related to the workflow history of document 215. In one embodiment, the timeline object includes timing information 1020, an event track 1030, a tools track 1040, a users track 1050, an annotation track 1060, and one or more other tracks related to data associated with application 210. Each information track of timeline window 330 may include one or more marker objects associated with a data object in event data 221. At step 1614, document workflow application extension 220 causes the timeline window 330 to be displayed in a timeline window 330 proximate to a host application window 310.

At step 1616, document workflow application extension 220 receives a selection of a first marker object in the timeline object. The first marker object is associated with at least one data object in event data 221. At step 1618, document workflow application extension 220 configures application 210 based on the information in the data object associated with the first marker object. In one embodiment, a user may right-click on a marker object in timeline window 330 to configure a feature of application 210 or to perform a scripted action based on the information in the data object associated with the marker object. For example, a marker object may be associated with a data object corresponding to an event generated when a user selected a line tool in application 210. By right-clicking on the marker object, the line tool will be selected in application 210 such that the user may generate a line in document 215.

Figure 17:
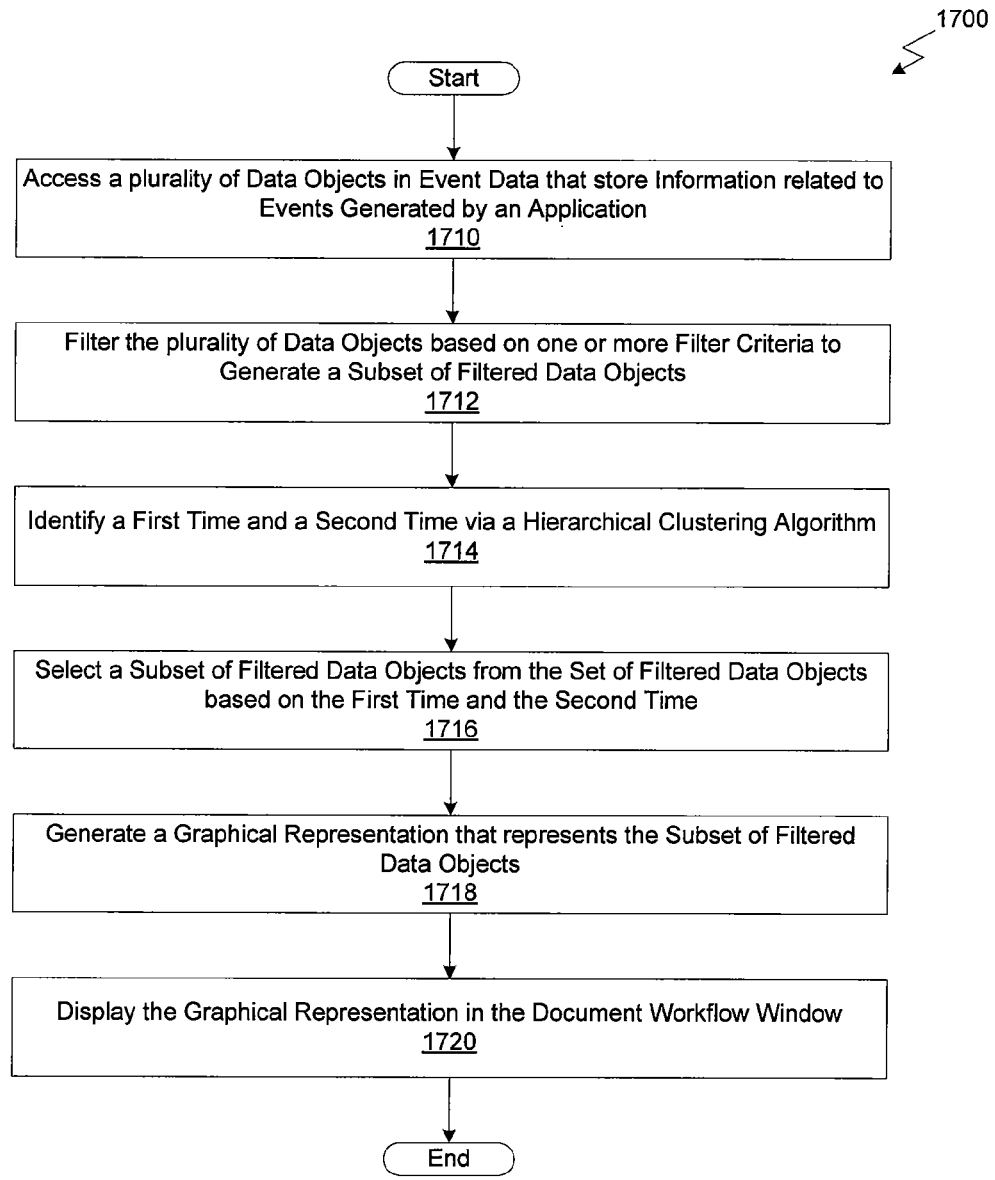
FIG. 17 is a flowchart of method steps for displaying a workflow history of a document, according to one example embodiment of the present invention.

FIG. 17 is a flowchart of method steps 1700 for displaying a workflow history of a document, according to one example embodiment of the present invention. Although the method steps are described in conjunction with the systems of FIGS. 1-12, persons skilled in the art will understand that any system configured to perform the method steps, in any order, is within the scope of the inventions.

The method 1700 begins at step 1710, where document workflow application extension 220 accesses a plurality of data objects in event data 221. In one embodiment, each data object in event data 221 stores information related to an event generated by application 210. At step 1712, document workflow application extension 220 filters the plurality of data objects in event data 221 to create a subset of filtered data objects. Document workflow application extension 220 filters the data objects in event data 221 based on one or more filter criteria. In one embodiment, the filter criteria may be selected by a user via one or more user interface elements included in document workflow window 320. In another embodiment, the filter criteria may be selected using native tools included in application 210. In yet another embodiment, document workflow application extension 220 selects the filter criteria based on an algorithm such as by filtering out every data object related to a feature of application 210 that the current user has never selected.

At step 1714, document workflow application extension 220 identifies a first time and a second time via a hierarchical clustering algorithm. In one embodiment, document workflow application extension 220 analyzes the set of filtered data objects via a hierarchical clustering algorithm. The first time and the second time may be identified based on at least one data object related to a save event. In another embodiment, the first time and the second time may be identified based on the largest elapsed time between subsequent events. At step 1716, document workflow application extension 220 selects a subset of filtered data objects from the set of filtered data objects in event data 221 based on the first time and the second time. In one embodiment, each data object in the subset of filtered data objects includes a timestamp that reflects a time that is either equal to the first time, equal to the second time, or falls between the first time and the second time.

At step 1718, document workflow application extension 220 generates a graphical representation that represents the subset of filtered data objects. In one embodiment the graphical representation includes a first thumbnail image that reflects a state of document 215 prior to any of the events corresponding to a data object in the subset of filtered data objects and a second thumbnail image that reflects a state of document 215 after all of the events corresponding to a data object in the subset of filtered data objects. At step 1720, document workflow application extension 220 causes the graphical representation to be displayed in a graphical user interface associated with the document workflow application extension 220.

In sum, the present application describes a system and technique for displaying a revision history of a document. The disclosed system includes a graphical user interface for displaying graphical representations of events generated by an application. Each of the events generated by the application is stored in a data structure that is associated with one or more portions of the document. The data structure may also be associated with a digital image that reflects the state of the document at the time the event was generated and one or more frames of digital video captured substantially simultaneously with the generation of the event. The system then displays the revision history via graphical representations in the graphical user interface. Each graphical representation represents a portion of the revision history of the document. A user may navigate through various graphical representations of events that are generated using a hierarchical clustering algorithm. A user may also view digital video of those events that are played back in a window overlaid over the host application window.

One advantage of the disclosed approach is that the system provides a flexible and intuitive approach for displaying and navigating the revision history of a document. Even a large revision history that includes hundreds of user operations may be reduced to a simple graphical representation that may be navigated by a user to visualize the revision history at finer and finer detail. A user may use tools within the system to filter or search the revision history for particular types of user operations. The hierarchical, high-level clustering algorithm also presents each of the user operations within the context of the complete revision history, allowing a user to visualize and learn various techniques for creating or modifying the content of a document.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method for capturing a workflow history of an electronic document, the method comprising:
   storing an array having a plurality of slots that each corresponds to a different cell in a plurality of cells, wherein each cell in the plurality of cells is associated with a different spatial subdivision of an image represented by the electronic document and includes one or more pixels included in the image;
   receiving an event generated by an application that is configured to modify at least one pixel corresponding to at least one cell in the plurality of cells;
   generating a data object that includes information related to the event;
   capturing a digital image that reflects a state of the document at a point in the workflow history of the document corresponding to when the application generated the event;
   storing the data object and the digital image in a memory; and
   storing a pointer to the data object in each slot in the array that corresponds to a cell of the document that is modified as a result of the event.

2. The method of claim 1, wherein the document is divided into a plurality of different portions.

3. The method of claim 2, wherein the document comprises a computer-aided design (CAD) model.

4. The method of claim 1, further comprising:
   capturing a plurality of frames of video data, wherein a first frame of the video data represents a state of the document prior to the generation of the event and a second frame of the video data represents a state of the document after the document has been modified as a result of the event;
   associating the data object with at least one frame of the plurality of frames of video data; and
   storing the plurality of frames of video data in the memory.

5. The method of claim 1, wherein the information related to the event includes a timestamp that indicates a point in time at which the event was generated by the application.

6. The method of claim 5, wherein the information related to the event further includes an identifier tag associated with a feature of the application related to the event.

7. The method of claim 1, wherein associating the data object with the digital image comprises storing a pointer in the data object that points to a location of the digital image in the memory.

8. The method of claim 1, wherein storing the pointer further comprises storing the pointer in response to receiving the event.

9. A non-transitory computer-readable storage medium containing a program which, when executed, performs an operation for capturing a workflow history of an electronic document, the operation comprising:
   storing an array having a plurality of slots that each corresponds to a different cell in a plurality of cells, wherein each cell in the plurality of cells is associated with a different spatial subdivision of an image represented by the electronic document and includes one or more pixels included in the image;
   receiving an event generated by an application that is configured to modify at least one pixel corresponding to at least one cell in the plurality of cells;
   generating a data object that includes information related to the event;
   capturing a digital image that reflects a state of the document at a point in the workflow history of the document corresponding to when the application generated the event;
   storing the data object and the digital image in a memory; and
   storing a pointer to the data object in each slot in the array that corresponds to a cell of the document that is modified as a result of the event.

10. The non-transitory computer-readable storage medium of claim 9, wherein the document is divided into a plurality of different portions.

11. The non-transitory computer-readable storage medium of claim 10, wherein the document comprises a computer-aided design (CAD) model.

12. The non-transitory computer-readable storage medium of claim 9, the operation further comprising:
   capturing a plurality of frames of video data, wherein a first frame of the video data represents a state of the document prior to the generation of the event and a second frame of the video data represents a state of the document after the document has been modified as a result of the event;

associating the data object with at least one frame of the plurality of frames of video data; and storing the plurality of frames of video data in the memory.

13. The non-transitory computer-readable storage medium of claim 9, wherein the information related to the event includes a timestamp that indicates a point in time at which the event was generated by the application.

14. The non-transitory computer-readable storage medium of claim 13, wherein the information related to the event further includes an identifier tag associated with a feature of the application related to the event.

15. The non-transitory computer-readable storage medium of claim 9, wherein associating the data object with the digital image comprises storing a pointer in the data object that points to a location of the digital image in the memory.

16. A system for capturing a workflow history of an electronic document, the system comprising:

a memory; and a processor coupled to the memory and configured to:

store an array having a plurality of slots that each corresponds to a different cell in a plurality of cells, wherein each cell in the plurality of cells is associated with a different spatial subdivision of an image represented by the electronic document and includes one or more pixels included in the image;

receive an event generated by an application that is configured to modify at least one pixel corresponding to at least one cell in the plurality of cells;

generate a data object that includes information related to the event;

capture a digital image that reflects a state of the document at a point in the workflow history of the document corresponding to when the application generated the event;

store the data object and the digital image in the memory; and store a pointer to the data object in each slot in the array that corresponds to a cell of the document that is modified as a result of the event.

17. The system of claim 16, wherein the document is divided into a plurality of different portions.

18. The system of claim 17, wherein the document comprises a computer-aided design (CAD) model.

19. The system of claim 16, the processor further configured to:

capture a plurality of frames of video data, wherein a first frame of the video data represents a state of the document prior to the generation of the event and a second frame of the video data represents a state of the document after the document has been modified as a result of the event;

associate the data object with at least one frame of the plurality of frames of video data; and store the plurality of frames of video data in the memory.

20. The system of claim 16, wherein the information related to the event includes a timestamp that indicates a point in time at which the event was generated by the application.

21. The system of claim 20, wherein the information related to the event further includes an identifier tag associated with a feature of the application related to the event.

* * * * *